(12) United States Patent
Reed et al.

(10) Patent No.: US 11,415,807 B2
(45) Date of Patent: *Aug. 16, 2022

(54) BUMPER SYSTEM

(71) Applicant: Mira Labs, Inc., Los Angeles, CA (US)

(72) Inventors: Montana Reed, Los Angeles, CA (US);
Norio Fujikawa, San Francisco, CA (US); Oliver Henderson, San Francisco, CA (US); Sean Missal, San Francisco, CA (US); Scott Pancioli, San Francisco, CA (US); Nicci Cazares, San Francisco, CA (US); Tom Cohlmia, Chicago, IL (US); Simon Gatrall, San Francisco, CA (US); Jessica Gilbertson, San Francisco, CA (US); Shawn Levin, Seattle, WA (US); David Rinaldis, Redwood City, CA (US)

(73) Assignee: Mira Labs, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,597

(22) Filed: Jan. 6, 2020

(65) Prior Publication Data

US 2020/0348525 A1 Nov. 5, 2020

Related U.S. Application Data

(63) Continuation of application No. 16/134,748, filed on Sep. 18, 2018, now Pat. No. 10,527,860, which is a
(Continued)

(51) Int. Cl.
*G02B 27/14* (2006.01)
*G03H 1/00* (2006.01)
(Continued)

(52) U.S. Cl.
CPC ...... *G02B 27/0176* (2013.01); *G02B 27/0172* (2013.01); *G02B 2027/0161* (2013.01)

(58) Field of Classification Search
CPC ........ G02B 2027/0187; G02B 27/0172; G02B 27/0025; G02B 27/0093; G02B 27/0176; G02B 27/0126; G02B 27/283; G02B 2027/011; G02B 2027/015; G02B 2027/0178; A61B 3/032; A61B 3/103; A61B 3/1015; A61B 3/14; A61B 3/113; A61B 3/1208; A61B 3/1225; A61B 3/024; G06F 1/163; G06F 3/011; G06F 3/012; G06F 3/013; G06F 3/017; G06F 3/03545
USPC ........ 359/630–636, 409–410, 462, 466, 639, 359/626, 13–14, 404, 407; 351/243, 200, 351/239, 246, 205–206, 210–211, 218, 351/220–223; 348/115; 345/7, 9, 156;
(Continued)

(56) References Cited

U.S. PATENT DOCUMENTS

2015/0253574 A1* 9/2015 Thurber ............. G02B 27/0172
359/630

* cited by examiner

*Primary Examiner* — Dawayne Pinkney
(74) *Attorney, Agent, or Firm* — Buchaler, A Professional Corporation; Sean Casey

(57) ABSTRACT

A headset system is described herein including a number of features including a frame and optical element. The headset system may include different combinations of bumper systems to permit the headset to accommodate different sized or dimensioned mobile device for use with the headset.

16 Claims, 20 Drawing Sheets

Related U.S. Application Data continuation of application No. PCT/US2018/051520, filed on Sep. 18, 2018.

(60) Provisional application No. 62/560,032, filed on Sep. 18, 2017, provisional application No. 62/591,760, filed on Nov. 28, 2017.

(51) Int. Cl.
*H04N 7/00* (2011.01)
*G09G 5/00* (2006.01)
*G02F 1/1335* (2006.01)
*G02B 27/01* (2006.01)

(58) Field of Classification Search
USPC ............ 349/11; 310/49 R, 156.35, 266–268, 310/156.02; 340/438, 980, 995.1, 815.47, 340/815.74
See application file for complete search history.

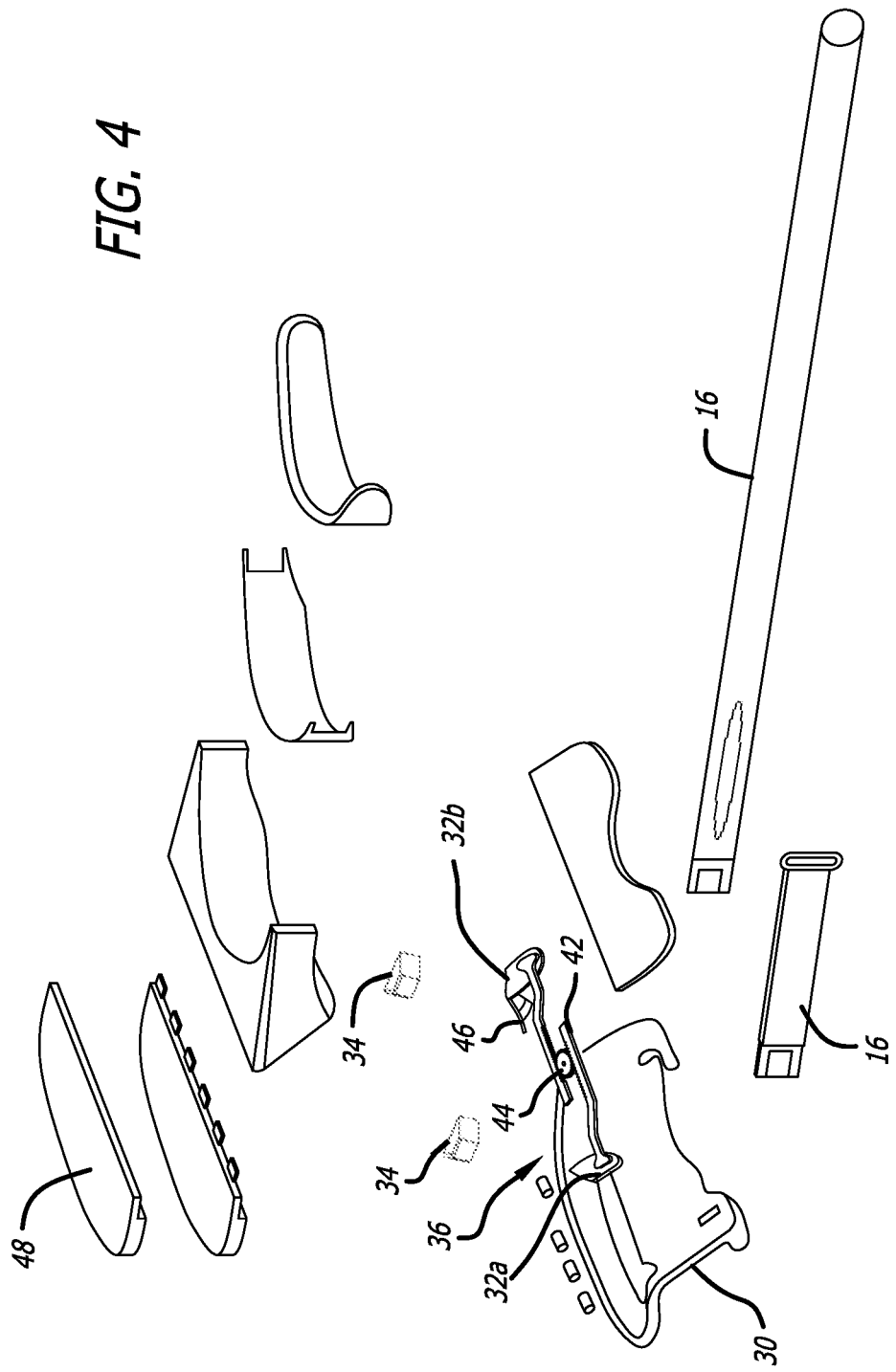

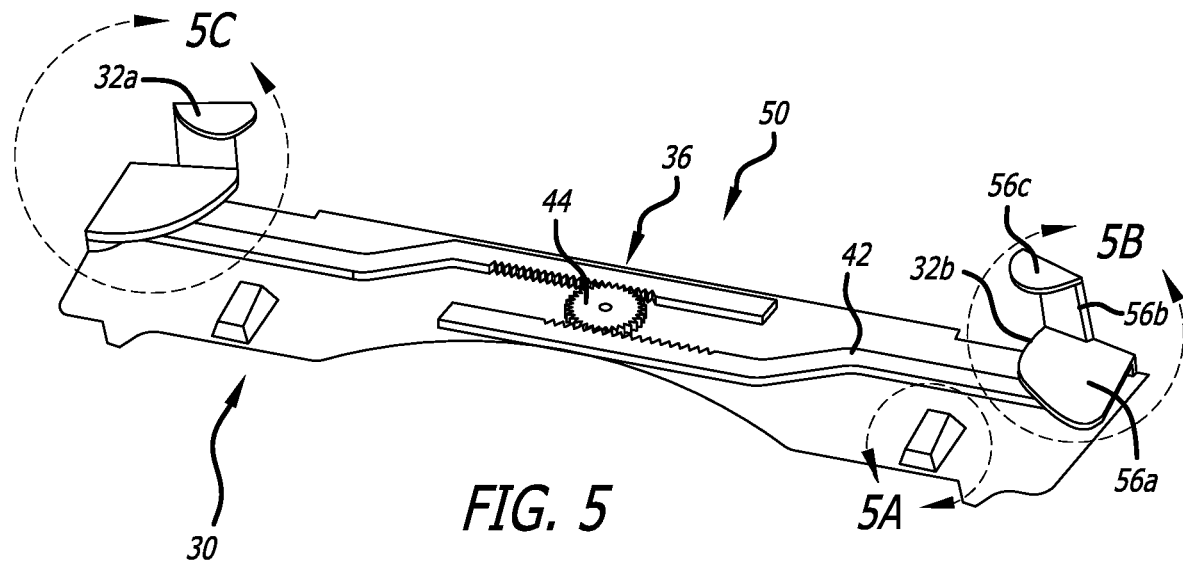
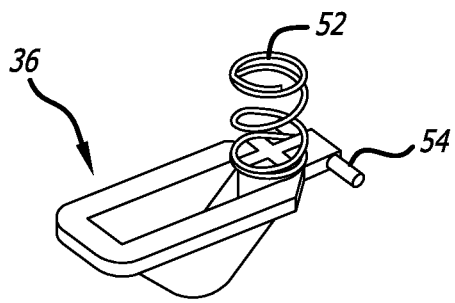
FIG. 5A
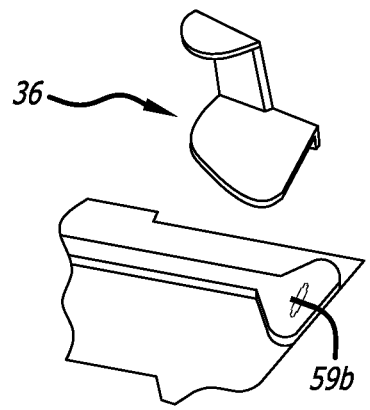
FIG. 5B
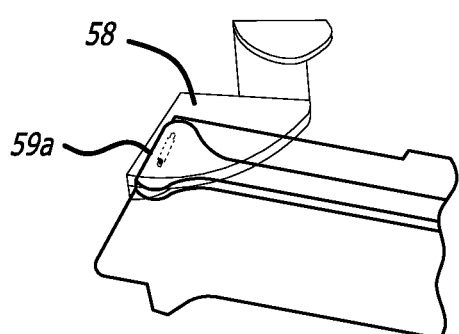
FIG. 5C

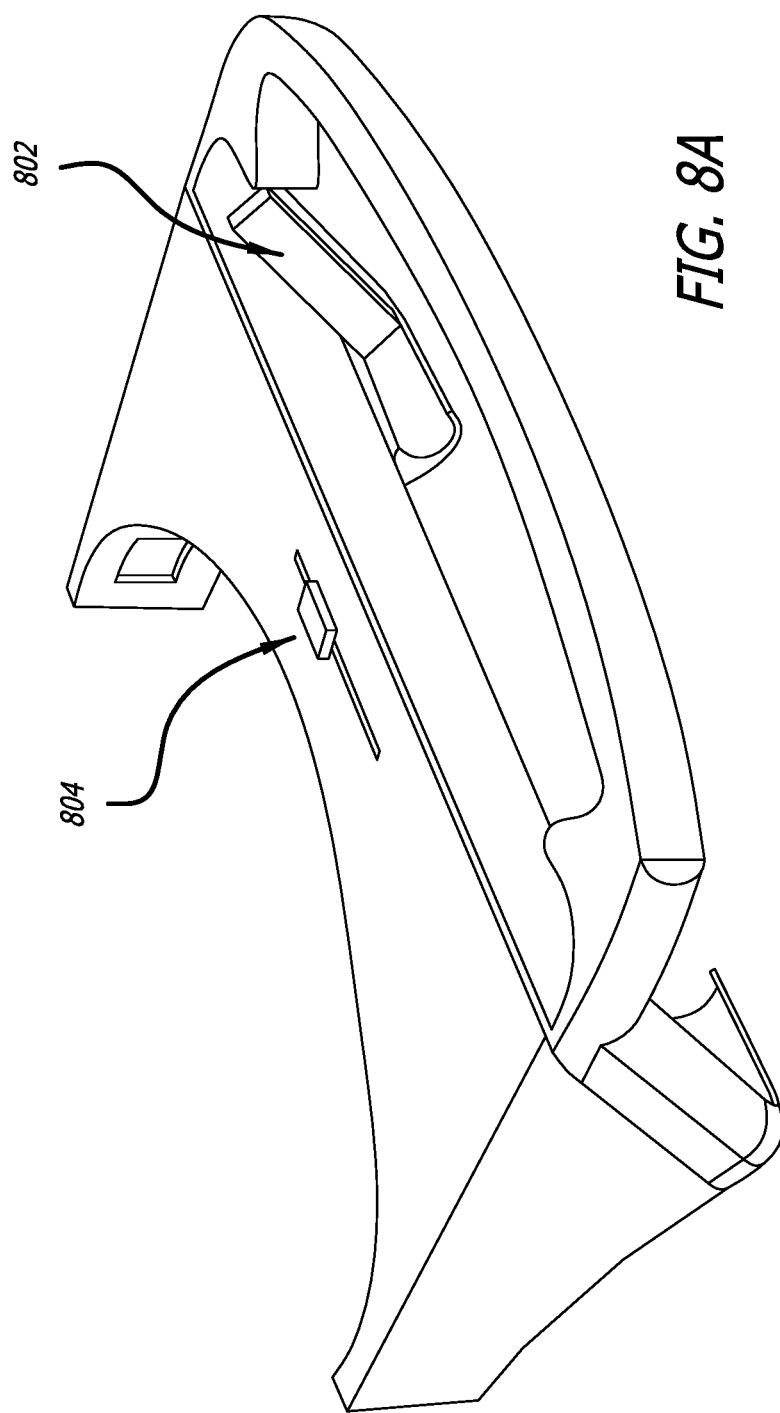

BUMPER SYSTEM

PRIORITY

This application is continuation of U.S. application Ser. No. 16/134,748, filed Sep. 18, 2018, now U.S. Pat. No. 10,527,860, which is a continuation of International Application No. PCT/US18/51520, filed Sep. 18, 2018, which claims priority to U.S. Application No. 62/560,032, filed Sep. 18, 2017; and U.S. Application No. 62/591,760, filed Nov. 28, 2017, each of which is incorporated by reference in its entirety into this application.

BACKGROUND

Head Mounted Displays (HMDs) produce images intended to be viewed by a single person in a fixed position related to the display. HMDs may be used for Virtual Reality (VR) or Augmented Reality (AR) experiences. The HMD of a virtual reality experience immerses the user's entire field of vision and provides no image of the outside world. The HMD of an augmented reality experience renders virtual, or pre-recorded images superimposed on top of the outside world.

U.S. application Ser. No. 15/944,711, filed Apr. 3, 2018, is incorporated by reference in its entirety herein, and describes exemplary augmented reality systems in which a planar screen, such as that from a mobile device or mobile phone, is used to generate virtual objects in a user's field of view by reflecting the screen display on an optical element in front of the user's eyes. FIG. 1 corresponds to FIG. 1 of the cited application and FIG. 2 corresponds to FIG. 3 of the cited application. FIG. 1 illustrates an exemplary headset for producing an augmented reality environment by reflecting images from a display off an optical element and into the user's eye to overlay virtual objects within a physical field of view. The exemplary headset 10 of FIG. 1 includes a frame 12 for supporting the mobile device having a mobile device 18 with a display 22, and optical element 14, and a mounting system 16 to attach the display and optical element to the user. FIG. 2 illustrates exemplary light paths from the display screen 22, off the optical element 14, and into a user's eye.

Using a mobile device inserted into a headset can cause problems when the mobile device is a mobile smart phone of a user. There are a number of different smart phones with different dimensional profiles. Therefore, to create a secure connection and/or accurate counter distortion profile, the headset needs to be designed and sized for a specific mobile smart phone. If additional or alternative mobile smart phones are accommodated in the same headset, the frame must be oversized to permit the insertion of different profiles. In this case, when smaller profile mobile devices are inserted, the device may not be properly positioned and/or may be less securely retained.

SUMMARY

Exemplary embodiments described herein include a static frame for supporting an inserted object therein. Exemplary embodiments may include an interior support mechanism. Exemplary embodiments may therefore be used to superimpose virtual objects displayed on the mobile device into the field of view of the user. In an exemplary embodiment, the optical element may be configured to be partially reflective and partially transparent so that the user may view the virtual objects overlayed on a physical environment viewed by the user through the optical element.

Exemplary embodiments described herein include a number of unique features and components. No one feature or component is considered essential to the invention and may be used in any combination or incorporated on any other device or system. For example, exemplary embodiments described herein are generally in terms of an augmented reality system, but features and components described herein may be equally applicable to virtual reality systems or other head mounted systems. Accordingly, headset system is intended to encompass any head mounted system including, but not limited to, augmented reality and virtual reality systems. Alternatively, or in addition thereto, exemplary embodiments and select components of the instant description may be used for other static frames intended to accommodate different or interchangeable objects inserted into the static frame where the inserted object may have different profiles or outer dimensions than another potentially inserted object. Exemplary embodiments may therefore be used to dynamically adjust an interior space to retain, secure, support, or otherwise accommodate interchangeable sized objects within a static outer frame.

In an exemplary embodiment, the frame may include one or more bumpers for contacting a surface of an inserted object. The one or more bumpers may be configured to move, translate, rotate, deform, or combinations thereof to accommodate different sized and/or shaped objects such that the relative position of the surface contacted by the bumper may be in different relative positions relative to the frame depending on the size and/or shape of the inserted object.

In an exemplary embodiment, the bumpers may define a first location and a second location. The bumper location or change of location from a first location to a second location may include a translational movement, linear movement, rotational movement, or combinations thereof. The second bumper location may contact a surface of an inserted object to reduce or prevent motion of the inserted object in one or more directions of the inserted object relative to the frame. In an exemplary embodiment, the bumper may provide or impose a force on the inserted device to retain the device in a given position. In an exemplary embodiment, a bumper may be used to provide a force against the inserted object on a surface opposite the frame such that the inserted object is retained between a static frame and the bumper. In an exemplary embodiment, a combination of bumpers may be used to retain the inserted object in a position relative to the frame in more than one axis.

In an exemplary embodiment, two bumpers may be used to secure an inserted object on opposing surface of the inserted object, such that the inserted object is positioned and in contact between the two bumpers. In an exemplary embodiment, the two bumpers may be configured to position a inserted object in a desired position relative to the frame. For example, the bumpers may be configured to center or approximately center the inserted device within the frame or between the bumpers.

In an exemplary embodiment, the frame may include an actuator to move the bumpers from a first location to a second location. The actuator may be integrated into one or more of the bumpers and/or may be separate and communicatively linked to the bumper.

DRAWINGS

FIG. 4 illustrates an exploded view of an exemplary bumper system according to embodiments described herein.

FIG. 5 illustrates exemplary internal components of a bumper system according to embodiments described herein. FIGS. 5A-5C illustrate exemplary partial views of FIG. 5.

FIGS. 8A-8C illustrate an exemplary bumper system according to embodiments described herein.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein include an insertion system that permits a rigid frame to accommodate inserted mobile devices of various outer dimensional sizes and profiles. Although the insertion system is described herein in reference to an augmented reality headset, the disclosure is not so limited. Various features and methods may be used in other applications in which an inserted device needs to be secured within a rigid frame while defining a precise position relative to the frame.

Figure 1:
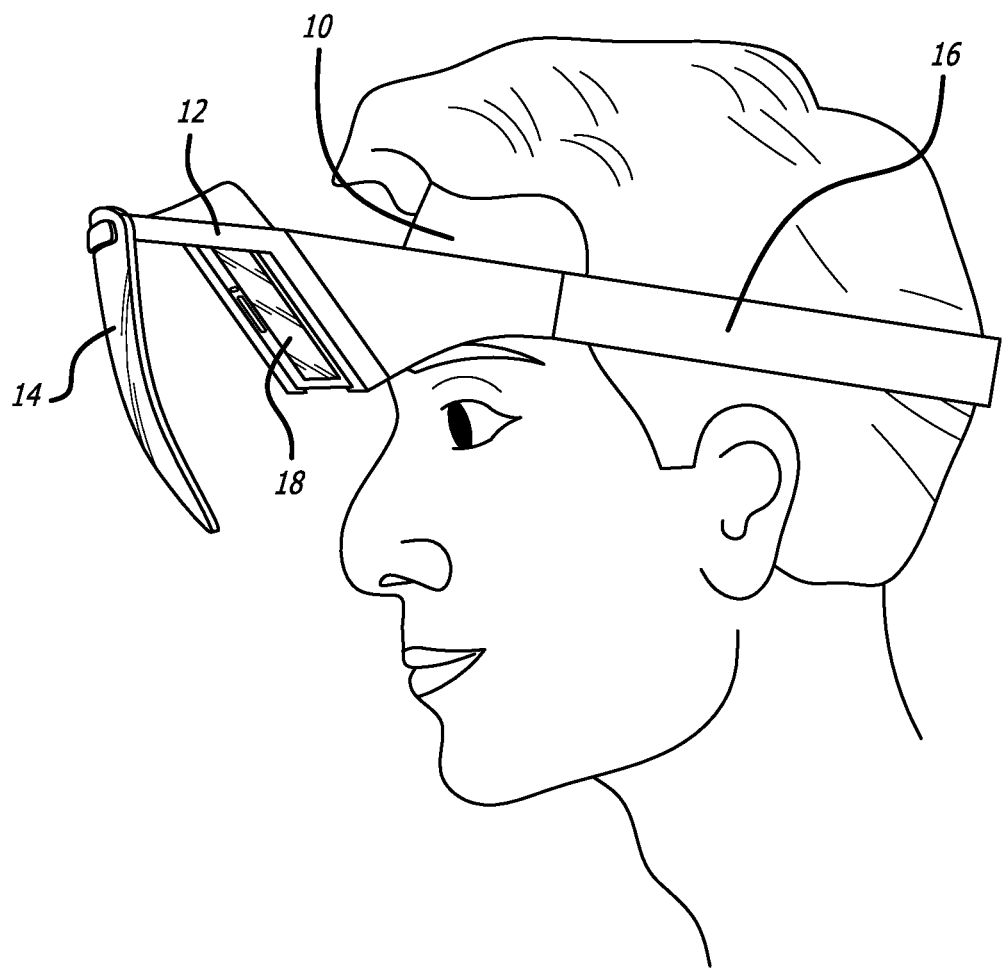
FIG. 1 illustrates an exemplary side profile view of an exemplary headset system 10 according to embodiments described herein positioned on a user's head.
Figure 2:
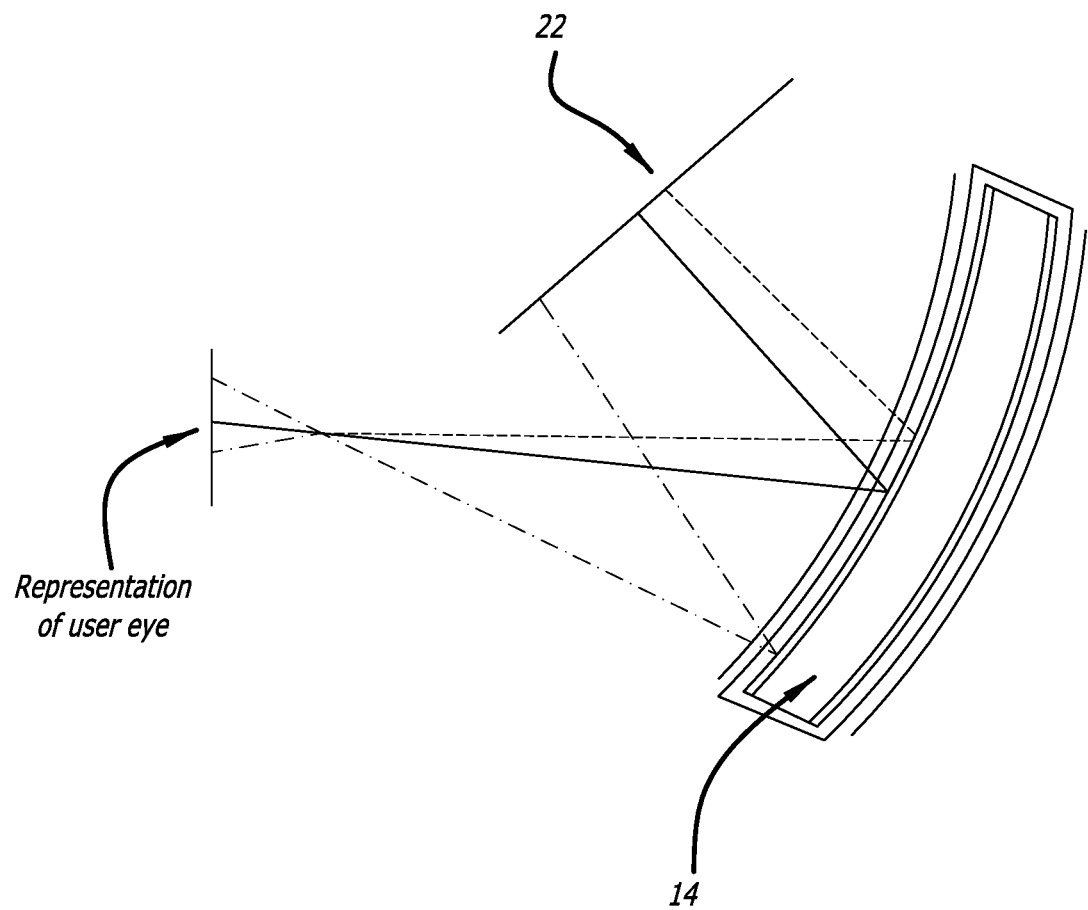
FIG. 2 illustrates an exemplary system of FIG. 1 in which elements of the headset have been removed to show relative component orientation.

As shown in FIG. 2, a mobile device 18 is inserted into a larger frame (seen in FIG. 1) that secures and positions the phone relative to the user and the lens system. There are different configurations of mobile devices having a display that could be used within the exemplary headset system. These different mobile devices may include different outer dimensions. Therefore, an individual phone's position within the frame may not be secure, repeatable, or precisely defined. Such imprecision between inserted devices may cause distortions of the rendered virtual objects when the images are displayed on the screen and reflected from the lens toward the user's eye. For example, the mobile device may be configured to display a stereoscopic image such that each side of the image is intended to be reflected off different sides of a lens system and projected each into a separate eye of the user. If the display generating the images is offset relative to the lens, then the generated images from each side may not properly coincide in the perception of the user. The generated images may be out of focus, may be duplicative, or may have other apparition or visual effects. Such effects may cause visual discomfort for the user or may detract from the virtual experience by reducing the reality of the experience.

Exemplary embodiments described herein include systems and methods to permit a head mounted display (HMD) that provides a consistent Augmented Reality experience across a wide diversity of smartphones. The diversity of smartphones may include smartphones of different outer dimensions, outer profile, thickness, width, length, screen size, shape, and combinations thereof.

In an exemplary embodiment, diverse phone configurations are accommodated by constraining the bottom edge of each smartphone model at the same position above the user's eyes and also constraining the screen planes to all be at the same position. In an exemplary embodiment, an inserted phone is pushed to the forward most position that the headset and optical system is designed for. This creates a uniform positioning of the display across all varieties of smartphone models. In an exemplary embodiment, the inserted phone is positioned relative to the headset and optical system such that a point on the screen may be known relative to the frame and/or optical system. For example, the inserted phone may be centered relative to the optical system and/or frame such that a position of the screen (such as a midpoint of the screen) may be known relative to the frame and/or optical system. In this case, the configuration of the stereoscopic images for presentation to each eye may be determined.

The uniformity achieved by the hardware enclosure enables a software solution that can digitally accommodate for the variety in screen dimensions by referencing a precompiled database of screen dimensions. These dimensions may then be used to generate a matching distortion profile based on the type of smartphone the user is currently using.

Exemplary embodiments may use any combination of features described herein to physically accommodate different-sized phones. For example, exemplary embodiments may use elastic-like tenting fabric to accommodate different phone heights, separately inserted bumpers to accommodate different phone widths between the phone and the frame, integrated bumpers to dynamically control a relative phone position to the headset in one or more axis. Exemplary integrated bumpers may include dynamic spring loaded bumper system, dynamic sliding gear system, deformable bumper portions, and combinations thereof.

Figure 3:
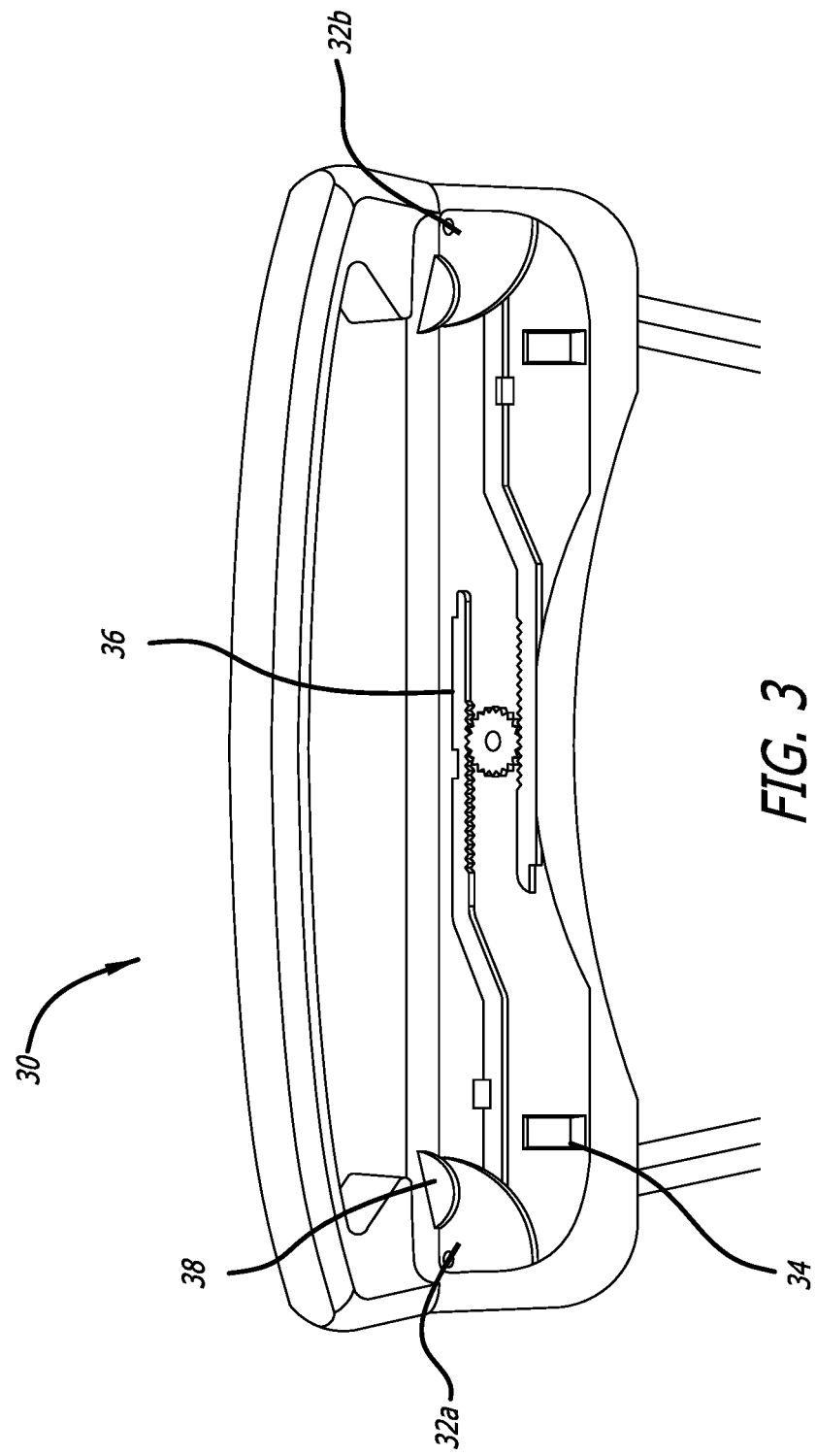
FIG. 3 illustrates an exemplary bumper system according to embodiments described herein in which the internal configuration is viewed through a surface of a frame of the system.

FIG. 3 illustrates an exemplary headset according to embodiments described herein. The exemplary headset may include a static frame 30. The frame 30 may be configured to support an inserted mobile device, the optical element for reflecting a virtual object from a display of the inserted mobile device into the eye of a user, and attachment mechanism to couple the headset to a user's head. The frame may be include one or more lateral sides, bottom sides, front sides, and/or back side for positioning relative to corresponding sides of an inserted mobile device. In an exemplary embodiment, the bottom side may include a surface for contacting a bottom side of the inserted phone to define a static position of the inserted device relative to the frame. The bottom side may include a lip or protection defining the front side or a portion of the front side configured to contact a front side of the inserted phone to define a static position of the inserted device relative to the frame. Accordingly, the frame may be configured such that an inserted phone may be positioned against the bottom side and front side of the frame when in a fully seated position within the frame. In an exemplary embodiment, one or more bumpers may be configured to position a point on the display of the inserted mobile device in a known location relative to the frame based on the position and/or contact of the phone relative to the bottom and front sides of the frame.

FIG. 3 illustrates a first bumper 34 for applying a pressure on the inserted mobile device in a seated position. The bumper 34 is configured to contact a surface of the inserted mobile device. The bumper 34 is configured to apply pressure on the inserted mobile device such that the inserted mobile device contacts a surface of the frame. In an exemplary embodiment, the mobile device contacts an interior surface of a front side of the frame. The bumper may exert a pressure on the inserted mobile device such that the mobile device is secured between the bumper and the frame.

FIG. 3 illustrates a second pair of bumpers 32a, 32b for securing and positioning an inserted mobile device in a seated position. The bumper 32a, 32b is configured to contact a surface of the inserted mobile device. The bumper may apply pressure on the inserted mobile device to define a position of the inserted mobile device relative to the frame. In an exemplary embodiment, the pair of bumpers are configured to move in tandem so that the inserted mobile device is centered between the bumpers 32a, 32b.

FIG. 3 illustrates an exemplary actuator 36. The actuator 36 may be configured to link a first bumper 32a to a second bumper 32b such that the movement of one bumper effects, controls, or is related to the movement of the other bumper. The actuator 36 may be configured to move a first and second bumper simultaneously such that the bumpers move by an equivalent amount. The actuator 36 may be configured to center or position an inserted mobile device in a desired location relative to the frame. The actuator may be configured to move one or more bumpers. The actuator may be automatically actuated by the insertion of a mobile device. The actuator may be separately actuated either manually or automatically separate from the insertion of the mobile device.

Exemplary embodiments of a bumper may dynamically move relative to the frame to position an inserted mobile device within the frame and accommodate different dimensions and/or shapes of inserted device.

As shown, a first bumper 34 may be a spring loaded or push button configuration that is configured to translate in a linear direction and/or rotate about a pivot. The bumper may be biased in a first position. The first position may be an extended position such that the bumper has a first surface positioned away from a surface of the frame. The bumper may be moved to a second position under application of a force, such as that imposed during insertion of a mobile device into the frame. The second position includes the first surface positioned toward the surface of the frame closer than in the first position. The bumper may define a gap between a second surface of the bumper and a second surface of the frame, wherein the inserted mobile device is configured to be positioned in the gap. During insertion, the bumper is configured to permit the gap between the second surface of the bumper and a second surface of the frame to increase.

As shown, a second bumper 32a may define a projection 38 to contact a side of an inserted mobile device. The projection may be configured to rotate from a first position to a second position. The second bumper 32a may be biased in the first position. The second bumper 32a may be configured such that the projection defines a surface generally parallel to a side of the inserted mobile device in the second position. The projection is approximately or generally parallel as variation may occur from the amount of rotation required to accommodate different sized mobile devices. The bumper 32a may be tethered or spring loaded to bias the bumper in the first position.

FIG. 4 illustrates an exemplary exploded view of a headset according to embodiments described herein. As shown, the headset includes a frame 30 for supporting an inserted mobile device. The frame 30 supports any combination of bumpers including a pair of first bumpers 34 and a pair of second bumpers 32a, 32b. The pair of second bumpers 32a, 32b may be linked or coupled through an actuator 36. The actuator 36 may include a pair of rails 42 and a gear 44 to coordinate the relative translation of the rails.

As seen in FIG. 4, the headset may include a third bumper 48. This bumper may contact a surface of the inserted mobile device and apply a pressure on the inserted mobile device to retain the mobile device in a position relative to the frame. As shown, the bumper 48 includes a first configuration defining a generally planar surface. The first configuration may correspond to an undeformed configuration. The second bumper may define a deformable material or surface that is configured to change under application of a force. In an exemplary embodiment, the third bumper 48 may comprise a flexible or stretchable material. As seen by a comparison of FIG. 1, the third bumper may deform with the insertion of an inserted mobile device.

FIG. 5 illustrates a component part view of an exemplary embodiment of a system for dynamically accommodating variable sized inserted objects according to the description herein. The system 50 may include one or more of a first bumper 36, one or more of a second bumper 32a, 32b, and combinations thereof. The exemplary bumpers may define one or more surfaces for contacting an inserted object. The exemplary bumpers may be configured to move relative to the frame 30. The bumpers may define a first position and a second position. The bumper first position may be a biased or resting position. One or more of the bumpers may be linked or coupled such that movement of one bumper is coupled to another bumper. One or more of the bumpers may be moved independently of one or more other bumpers.

In an exemplary embodiment, a first bumper 36 may include a mated surface 54 for connecting to a corresponding mated surface on the frame. The connection between the mated surfaces of the frame and first bumper may permit the first bumper to move relative to the frame. The movement may be rotational, linear, translational, and combinations thereof. The first bumper 36 may also include a biasing mechanism for biasing the first bumper in a first position. As shown, the biasing mechanism may be a spring 52. Other biasing mechanisms may be used such as a remembered material state, a tether, a projection, a deformable surface, and combinations thereof. When constructed, the spring 52 contacts surfaces of the first bumper 36 and the frame 30 to define a first position in which the first bumper is in an extended position relative to the frame. The extended position may define a maximum height of the first bumper from a surface of the frame. The connection between the mated surfaces may permit rotational movement about an axis of the connection. Under an influence of an external force, the first bumper 36 is rotated relative to the frame and the spring 52 compressed. The first bumper 36 thereby exerts a force through the spring. Under the influence of the external force, the first bumper 36 is positioned in a second position different from the first position. The second position may be a retracted position relative to the frame such that a height of the first bumper from the frame is less than the height of the bumper in the first position.

In an exemplary embodiment, a second bumper 32a includes a mated surface 58 for coupling the second bumper to the frame 30. The mated surface may be a protection and indentation or aperture. The mated surface may include a hinge, rivet, rod, or other connection between the second bumper and frame. The mated surfaces may permit the second bumper to move relative to the frame. The movement may be linear, translational, rotational, and combinations thereof. The second bumper may include a biasing element 46 configured to position the second bumper in a first position relative to the frame. The second bumper may include a plurality of surfaces for contacting or retaining different surfaces of an inserted device or to restrict motion of the inserted device in one or more directions. For example, the second bumper may include a first surface 56a supporting the mated surface for connection to the frame. The first surface may be parallel to a back surface of an inserted device. A second surface 56b may project from a front of the first surface 56a. The second surface may be generally perpendicular to the first surface and configured to contact a lateral side of an inserted device. A third surface 56c may project from an opposing end of the second surface 56b as the first surface 56a. The third surface 56c may be generally parallel to the first surface 56a and/or perpendicular to the second surface 56b. The third surface 56c may be configured to contact a front side of an inserted device.

In an exemplary embodiment, the second bumper 32a may be coupled to an actuator 36. The actuator 36 may include a first rail 42 coupled to a second bumper 32a and a second rail 42 coupled to a second bumper 32b. The first and second rail 42 may be coupled together through a gear 44. The gear 44 and rails 42 may include mated surface or engaging teeth such that movement of one rail forces the rotation of the gear and corresponding movement of the other rail. As shown, the rail may include mated surface to the second bumper. The mated surface may include a projection 59a on the second bumper that is configured to position within an indentation on the rail 59b, which may extend partially or all the way through the rail. As shown, the rail 59b includes a flared terminal end that accommodates the mated surface including the indentation. The indentation may define an elongated path. The elongation of the path may be generally perpendicular to the length of a portion of the rail. When the mated surfaces of the second bumper correspond to respective mated surfaces of the frame and rail, the second bumper is configured to rotate during insertion of the mobile device. The rotation of the second bumper permits the projection of the second bumper to rotate relative to the frame and translate along the indentation. As the projection translates along the indentation, the rail is translated, which corresponds to rotation of the gear and translation of the second rail and corresponding other second bumper. As shown, the system may include a second bumper and rail configured as a mirror orientation except for the rail position at or proximate to the gear. As shown, each rail may diverge along a path such that one rail is positioned on one side of the gear and the other rail is positioned on the opposite side of the gear.

As would be understood to a person of skill in the art, other configuration of bumpers may be used and remain within the scope of the instant invention. For example, bumpers may include deformable materials configured to stretch and or compress during insertion of the mobile device. The bumpers may include other rotational or translatable portions configured to contact an inserted mobile device and change a dimension of the frame for accommodating variably sided inserted devices.

Figure 6A:
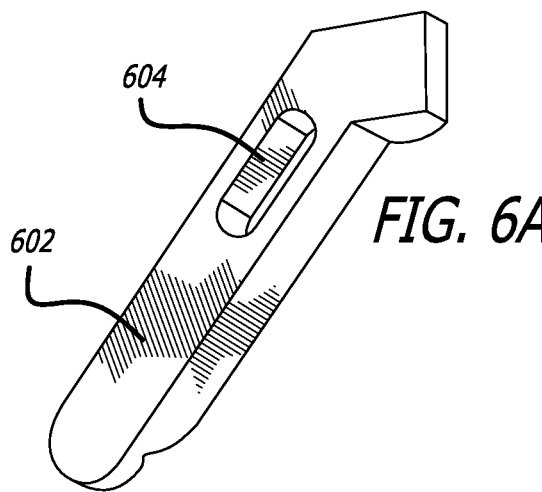
FIGS. 6A-6D illustrate exemplary bumpers separate from and inserted into an exemplary frame according to embodiments described herein.
Figure 6B:
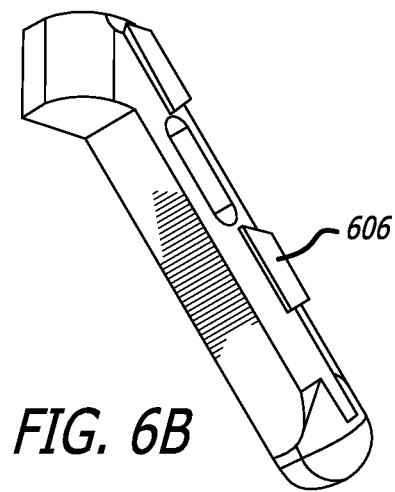

In an exemplary embodiment, a system and method for interchangeably accommodating various mobile devices includes bumpers defines as removable inserts between the frame of the headset and the mobile device. FIGS. 6A-6B illustrate an exemplary embodiment of a bumper 602 according to embodiments described herein. The inserts may include a surface, shape, profile, of combination thereof that may approximate one or more internal or external dimensions of the headset frame to securely position the insert relative to the frame when a mobile device is inserted. The inserts may have a surface, shape, profile, or combination thereof that approximates a portion of the inserted mobile device. In an exemplary embodiment, the insert may include one or more apertures (fully enclosed by the insert or partially formed by the insert such that the aperture is along an edge of the insert) for permitting access to a portion of the mobile device through the insert.

Figure 6C:
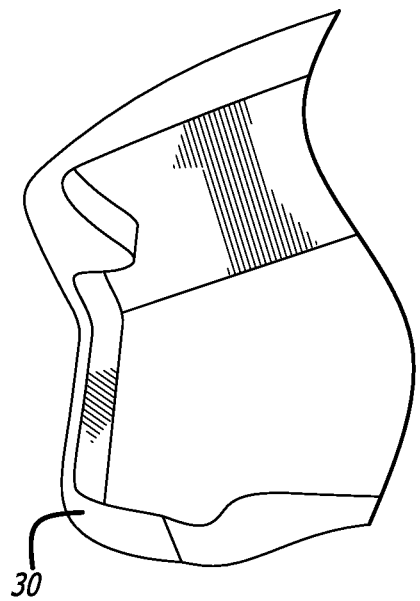
Figure 6D:
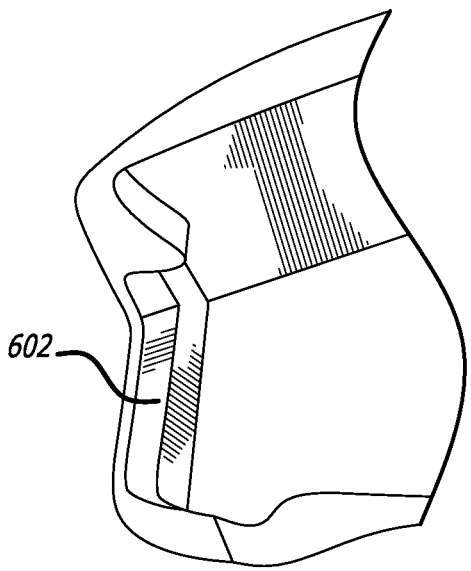

In an exemplary embodiment, the insert may include an elongate portion for positioning between the headset frame and an end surface of the inserted mobile device. The exemplary insert may include a first elongate portion and a second elongate portion extending from the first elongate portion. The first elongate portion may include a mating feature 606. The mating feature may be, for example, a flange, ridge, or other projection. The mating feature 606 may be configured such that a surface defined by the mating feature may approximate or correspond to a shape, surface, or configuration of an inserted mobile device. For example, during use with a larger mobile device, the mobile device may be inserted into a frame without use of the insert. For use with a smaller mobile device, however, the insert may be position between the frame and the inserted mobile device. The insert may therefore bridge or fill a gap in a first direction (such as the terminal lateral side of the mobile device and the side of the frame) to accommodate for a reduced first dimension. The insert may also include a mating feature to accommodate for a reduced second dimension and contact a different surface of the inserted mobile device. For example, as shown, the projection 606 may define a surface for contacting a back of a mobile device of reduced thickness such that the projection may take up all or part of a gap between an inserted mobile device and the frame of a device having a reduced thickness. FIG. 6C illustrates an exemplary embodiment of a frame without an inserted mobile device or insert. The frame is configured to correspond to a device of a first shape. FIG. 6D illustrates an exemplary embodiment of the frame with an insert positioned therein. The frame and insert is configured to correspond to a device of a second shape having one or more dimensions smaller than the first shape.

Figure 7:
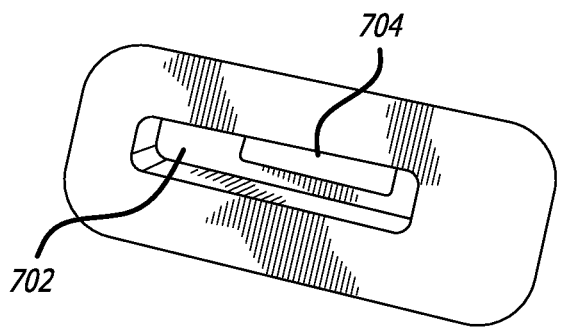
FIG. 7 illustrates an exemplary bumper according to embodiments described herein.

FIG. 7 illustrates an exemplary insert 702 defining a different shape. The exemplary insert includes an aperture 704 for permitting access through the insert to the mobile device.

In an exemplary embodiment, the first elongate portion may be configured to approximate a first portion of the frame and the second elongate portion may be configured to extend along a second portion of the frame. The exemplary insert may therefore be configured to act to increase a thickness of an end portion or wall of the frame. In an exemplary embodiment, the projection is configured to extend along all or a portion of the longitudinal length of the first elongate portion. The projection may extend along an edge of one side of the elongate portion such that the edge of the elongate portion is configured to contact an end of the inserted mobile device and a surface of the projection is configured to contact a front or back surface of an inserted phone to position the mobile device in a secure and known position relative to the frame.

Exemplary embodiments of inserts may define mated surfaces with the frame such that they clip or frictionally engage with the frame to retain a position of the insert within the frame. Exemplary embodiments may include a system of one or more inserts for changing different sizes of a frame to correspond to different inserted device. In an exemplary embodiment, two inserts can be used simultaneously, one for each side of the inserted device to keep the display centered relative to the frame and/or optical element. Inserts can also be placed asymmetrically in order to shift the phone camera over to one side allowing for a less obstructed camera feed when looking through the reflective lens. Inserts may be interchangeable to accommodate different sized inserted devices.

Figure 8B:
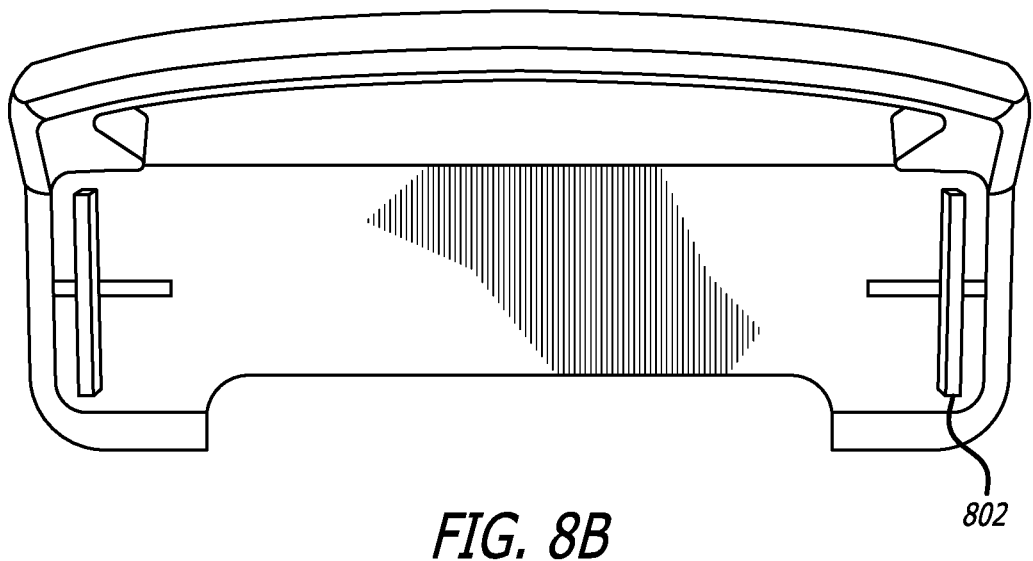
Figure 8C:
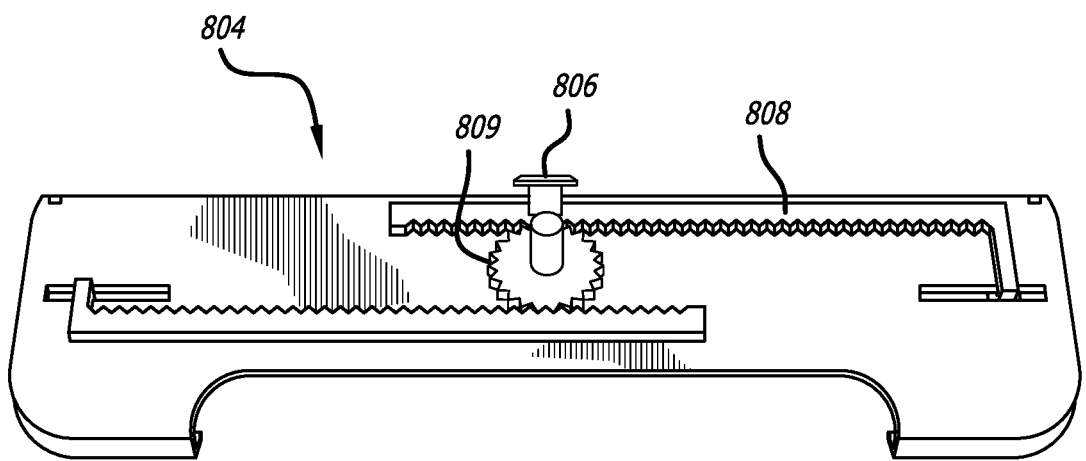

FIGS. 8A-8C illustrate exemplary embodiments of a bumper integrated with a frame. The frame may include a pair of bumpers 802 controlled by an actuator 804. In an exemplary embodiment, the actuator includes an internal sliding gear based system. The actuator 804 may include an adjustment switch on a top portion (or other location) of the headset configured to be manually operated by the user. Exemplary embodiments may include a pair of symmetrical elongate sliding bumpers that are attached to internal gear racks that push the inserted mobile device toward the center of the frame when the user engages the actuator the system.

FIG. 8A illustrates a perspective view of a portion of a headset according to embodiments described herein. FIG. 8B illustrates an exemplary front view of the headset and illustrates the exemplary pair of bumpers that are attached to the internal gear racks. FIG. 8C illustrates an exemplary inside of the headset and the contained sliding gear rack system. The actuator 804 may include rails 808, gear 809, and switch 806. The gear 809 and rails 808 may be configured as described herein and permit the coordinated movement of a pair of bumpers. As shown, a switch 806 is coupled to one of the rails 808. Translation of the switch translations the rail. The rail is coupled to the bumper such that translation of the rail translates the bumper. The rail is also coupled to the gear such that translation of the rail, rotates the gear. The gear is coupled to the second rail such that rotation of the gear translates the second rail. The second rail is coupled to the second bumper so that translation of the rail translates the bumper. Accordingly, when the switch is moved to the left in the direction of the arrow, it pulls the attached bumper linearly towards the center of the frame. As the top gear rack moves, it causes the gear to turn and simultaneously pulls the other bumper towards the center of the headset. If a mobile device is placed in the headset and the user tightens the gear system, the mobile device can be positioned in the center or desired relative position relative to the frame. Exemplary embodiments may include a frictional engagement and/or biasing mechanism, such that the bumpers can be positioned toward the inserted mobile device during use and secure the inserted mobile device relative to the frame.

Figure 9:
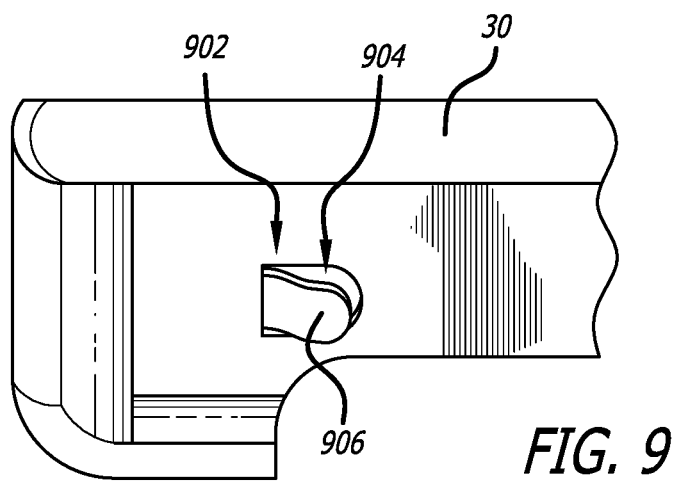
FIG. 9 illustrates an exemplary bumper according to embodiments described herein.

FIG. 9 illustrates an exemplary bumper 902 according to embodiments described herein. The frame may include a bumper 902 for dynamically accommodating mobile devices of various thickness. An exemplary embodiment of a bumper may include a moveable clip. The clip may include a projection configured to pivot or translationally move relative to the frame and provide a biasing force against the surface of the inserted mobile device in contact with the clip. In an exemplary embodiment, the frame 30 includes an aperture 904 and a projection 906 extending from a rim of the aperture into the space of the aperture. The projection 906 may extend out of plane of the frame 30 and is configured to move relative to the frame. In an exemplary embodiment, the projection may move into and out of the space of the aperture. The projection may have a flat portion positioned generally parallel to the frame portion having the aperture. FIG. 9 illustrates an exemplary bumper 902 comprising a deformable material having a first remembered configuration and a deformable configuration. The bumper may be deformable such that an inserted mobile device applies a force on the bumper to deform the bumper from a first position to a second position. Accordingly, the bumper may be configured to exert a force on the inserted device and push the inserted device forward such that the inserted device presses against a portion of the frame. Exemplary embodiments may be configured such that the bumper acts as a "spring" to accommodate inserted devices of different thicknesses and push the inserted device forward to position a screen plane in a desired position relative to the frame. The bumper may return to the remembered or first position once the inserted device is removed. Exemplary embodiments, may orient the clip to facilitate insertion of the mobile device. The tap and projection of the clip may be coupled to the aperture at a top, bottom, or side of the aperture, whichever is likely to be contacted or encountered by an inserted device such that the inserted device may contact the projection and not be stopped by a discontinuity caused by the projected tab.

Figure 10:
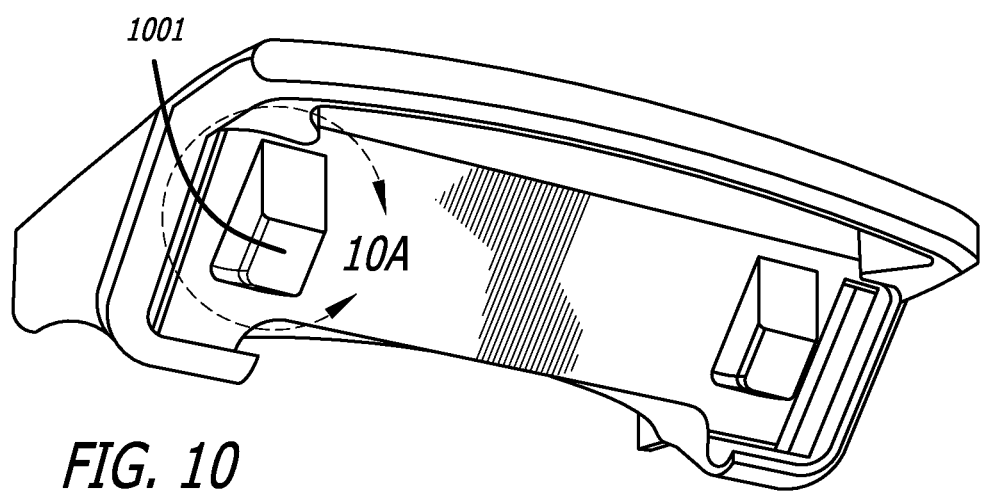
FIG. 10 illustrates an exemplary bumper according to embodiments described herein.
Figure 10A:
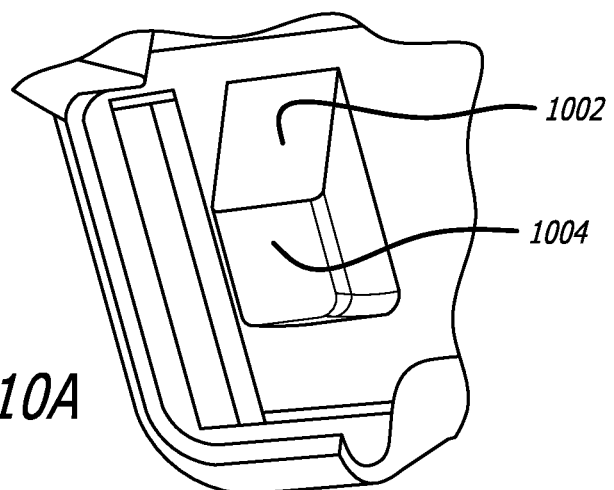
FIGS. 10A-10H are partial component views of FIG. 10 in various positional configurations.

FIG. 10 illustrates an exemplary bumper according to embodiments described herein. FIG. 10A is a blown up illustration of the bumper of FIG. 10. The profile of the bumper 1001 is similar to that of FIG. 9 in which an inclined surface 1002 extends from a planar surface of the frame to a second planar surface 1004 generally parallel to the planar surface of the frame. The inclined surface may be on a side of the bumper likely to encounter an inserted device first to facilitate insertion and/or reduce binding with a lateral side or discontinuity created by the projection of the bumper. The inclined surface may therefore be on a top, bottom, or lateral side of the bumper. In an exemplary embodiment, the bumper may be biased in a projected or fully extended configuration. The bumper may be configured to move from the first position or biased position to a second position. The bumper may be configured to apply a biasing force toward the first position when in the second position. In an exemplary embodiment, the bumper may be biased with a spring.

Figure 10B:
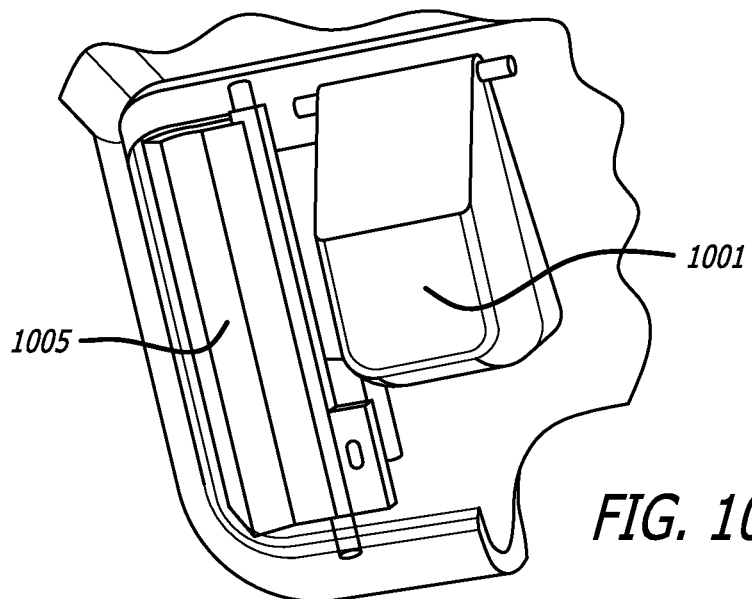

FIG. 10B illustrates a view of the bumper of FIG. 10 as seen through the frame surface. As seen, the frame may include a first bumper 1001 and a second bumper 1005. As seen, the first bumper 1001 includes an attachment surface for rotational attachment to the frame. As seen, the second bumper 1005 also includes a rotational attachment to the frame.

Figure 10C:
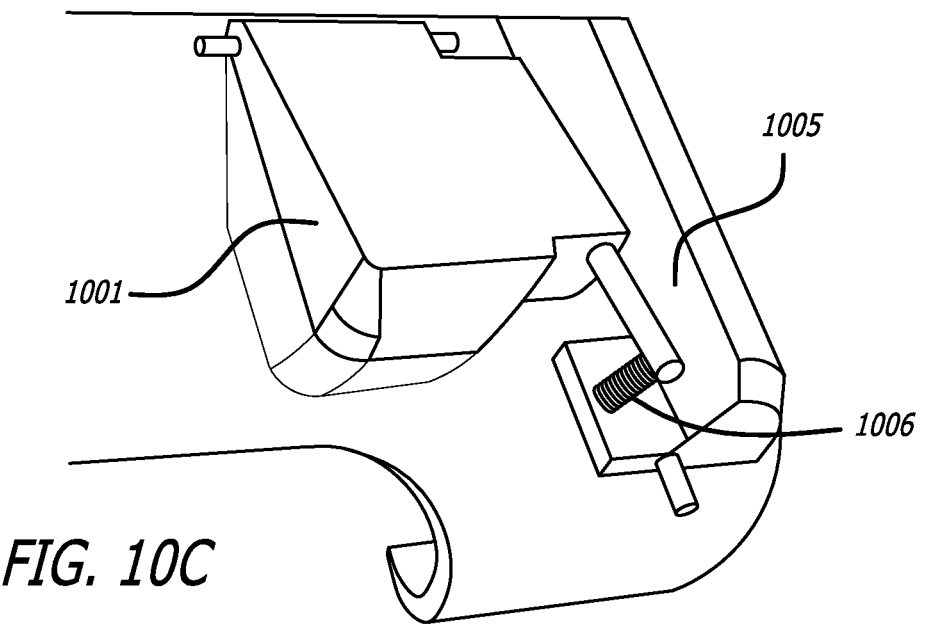
Figure 10D:
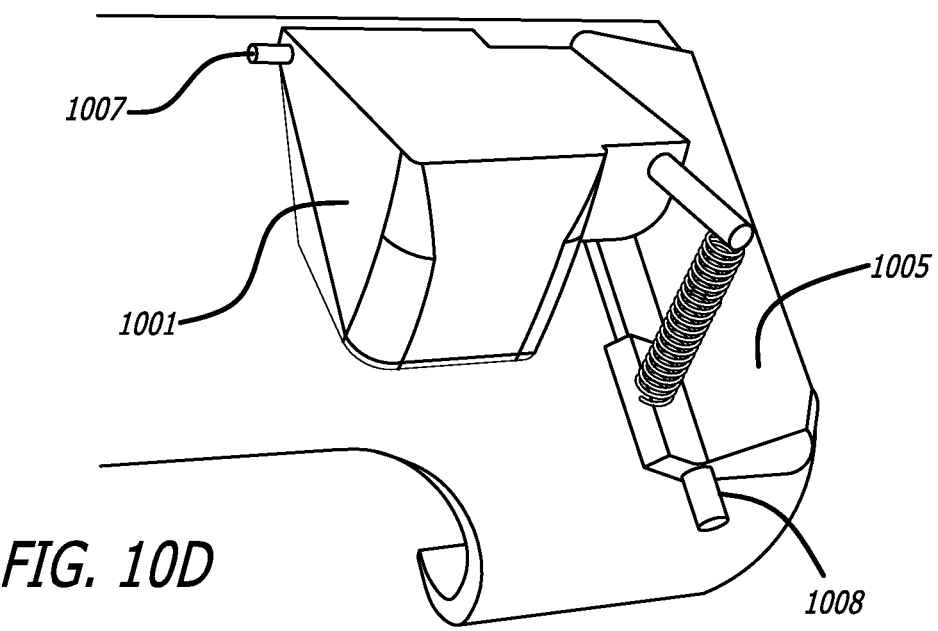
Figure 10E:
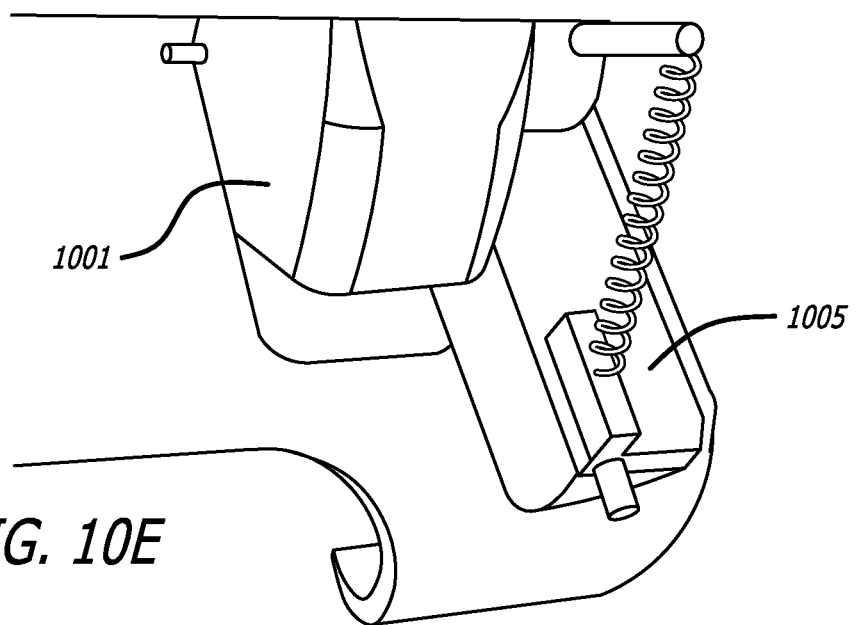
Figure 10F:
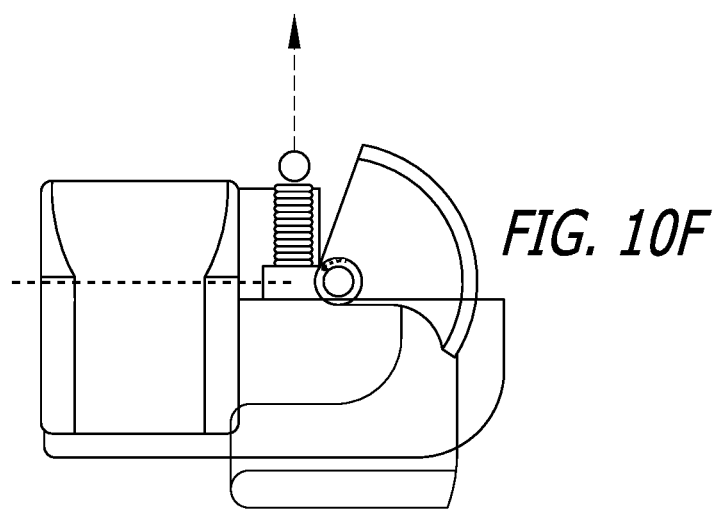
Figure 10G:
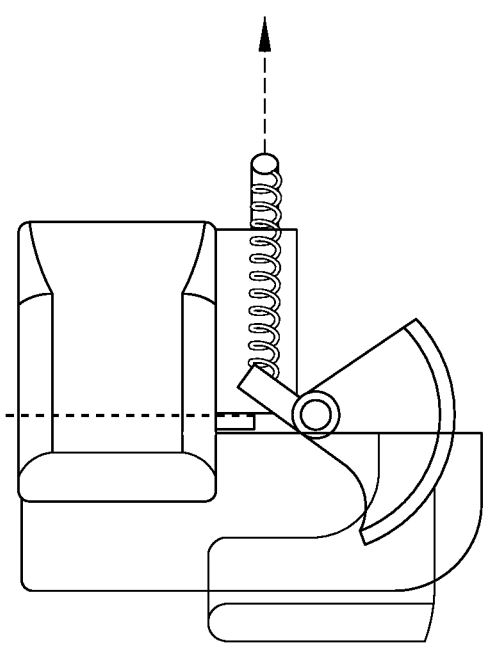

In an exemplary embodiment, more than one bumper may be coupled such that movement between the bumpers may be influenced or coordinated by the other. FIGS. 10C-10E illustrate an exemplary embodiment in which a first bumper is coupled to a second bumper to coordinate movement there between. FIGS. 10F-10G illustrate the coupling between the first and second bumpers as seen in FIG. 10C-10E from a different perspective. FIG. 10C illustrate an exemplary combination of bumpers in the biased or resting state in which no external force is applied to the frame and/or bumpers. As shown, the first bumper 1001 is coupled to a second bumper 1005 by a spring 1006. The spring 1006 is compressed extending a front face of the bumper 1004 through an aperture in the frame and away from the frame its greatest extent. When the first bumper 1001 is depressed, as seen in FIG. 10D, the first bumper 1001 rotates about its connection mechanism 1007 to the frame and the spring 1006 is extended. The spring 1006 applies a force at a connection point to the second bumper 1005 and rotates the second bumper 1005 about its connection mechanism 1008 to the frame. As seen in FIG. 10E, when the first bumper 1001 is depressed, the first bumper becomes flush with the frame surface, and the second bumper 1005 is rotated inward and extends outward from the frame surface. The system thereby defines a first combined position defining a cavity within the frame with a thickness of reduced dimension because the first bumper is in an extended position and the cavity within the frame with a width of increased dimension because the second bumper is in a contracted position. The system defines a second combined position wherein the cavity within the frame has a thickness of increased dimension because the first bumper is in a contracted position and a width of decreased dimension because the second bumper is in an extended position.

The exemplary embodiment may be used to create a movement link between a first bumper and a second bumper. The second bumper may also be linked to a third bumper. The third bumper may be a mirror configuration of the second bumper on an opposing side of the frame. The third bumper may be linked to the second bumper and/or to a fourth bumper, wherein the fourth bumper is configured similar to the first bumper. The link between the second and third bumper may be through a series of rails and/or gears.

In an exemplary embodiment, the movement link between the first and second bumper may be separated based on the size of an inserted object. For example, if an inserted device has a width dimension that contacts the second bumper at its position as seen in FIG. 10D, but a thickness that rotates the first bumper to its position in FIG. 10E, the spring connection between the first and second bumper will permit the first bumper to continue to rotate, while the second bumper is held stationary relative to the inserted object. Therefore, the connection between the first and second bumper may permit simultaneous movement of one bumper based on the movement of the other bumper over a portion of movement of the other bumper, but may also permit independent movement of the other bumper while the one bumper is held stationary.

Figure 10H:
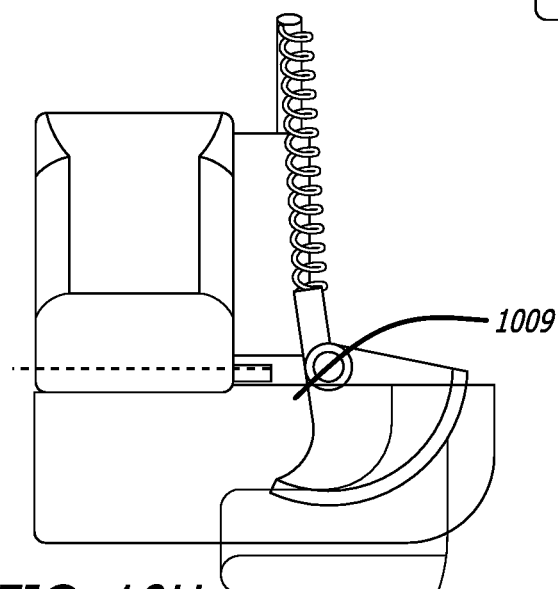

As seen in FIGS. 10F-10H, a bumper may include a contoured surface 1009 to create an engagement with the inserted object. As seen in FIG. 10H, the contoured surface may define a peripheral edge having a lip or protection. The lip may be formed from a continuous or discontinuous projection from the bumper. The lip may provide a wrap-around portion for the inserted object, such that the bumper may contact the inserted object on more than one side.

Figure 11A:
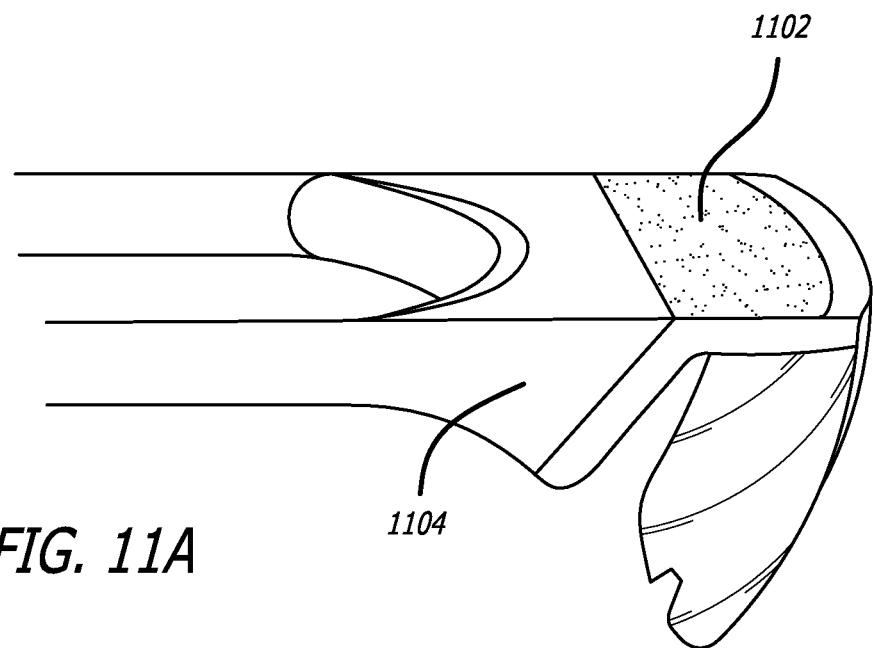
FIGS. 11A-11B illustrates an exemplary bumper according to embodiments described herein.
Figure 11B:
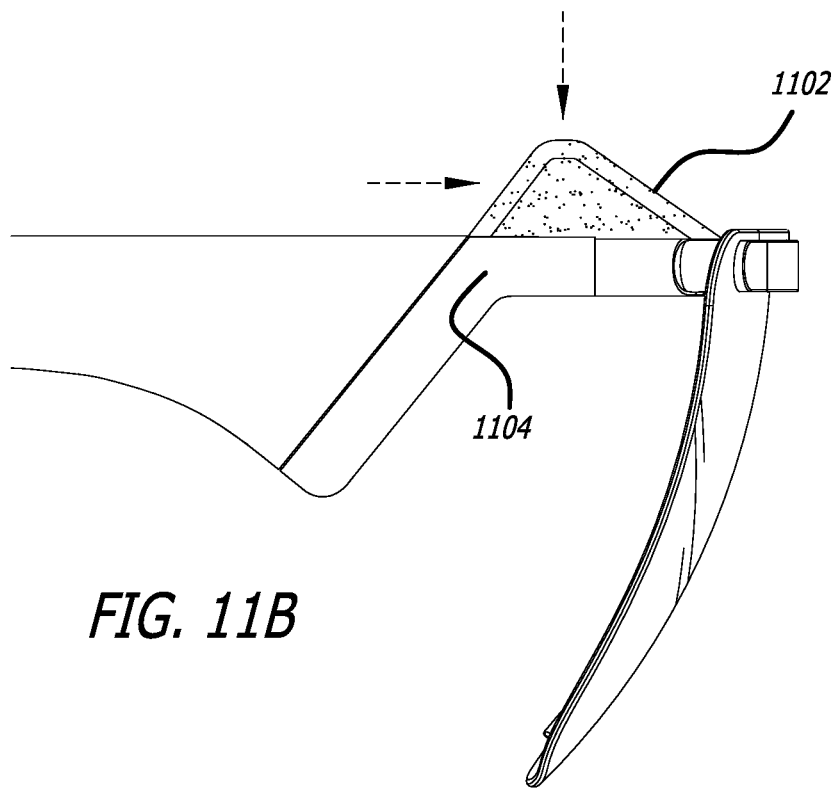

In an exemplary embodiment, the frame for the mobile device may include a bumper according to embodiments described herein. As seen in FIGS. 11A-11B, the bumper 1102 may define an elastic cover that may stretch to accommodate various sizes of inserted devices. The elastic cover may have a planar, unbiased configuration. The elastic cover may have a generally pyramid biased configuration when a phone is inserted into the frame. The elastic cover may be positioned relative to the frame 1104 to provide a biasing force on the inserted mobile device toward the frame in a specific direction. For example, the elastic cover may be configured to bias the phone toward a bottom of the frame and toward the front of the frame away from the user's face and toward the lens as indicated by the arrows in FIG. 11B.

FIGS. 11A-11B illustrate an exemplary embodiment of a bumper comprising an elastic-like tenting fabric that applies forward pressure to the top of the phone moving the top of the screen forward against the frame and applies downward pressure to the top of the phone moving the bottom of the screen against the frame.

Figure 12A:
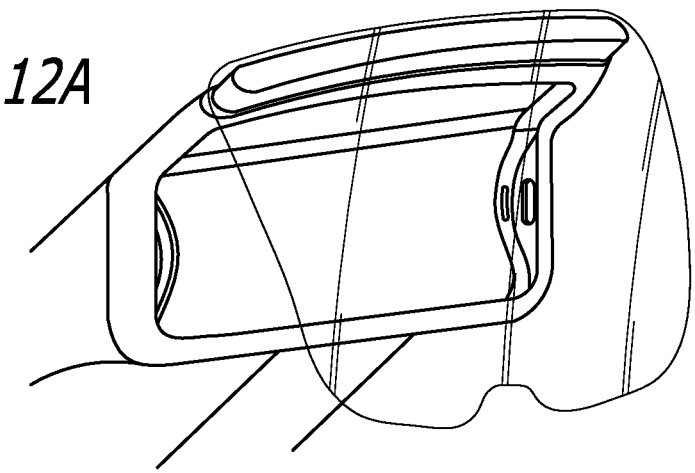
FIGS. 12A-16B illustrate exemplary bumper systems according to embodiments described herein.
Figure 12B:
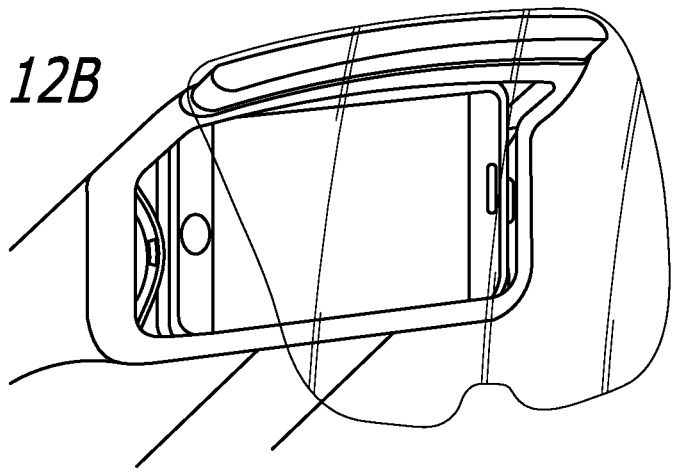
Figure 12C:
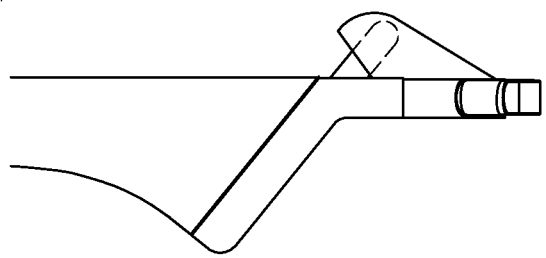

FIGS. 12A-12B illustrate an exemplary embodiment of a bumper. FIG. 12A illustrates an exemplary headset including the exemplary bumper without an mobile device inserted therein, while FIG. 12B illustrates the exemplary headset including the exemplary bumper with a mobile device inserted therein. As shown, the exemplary bumper may include a deformable projection extending toward a center of the cavity defined by the frame for support a mobile device therein. The bumper may be configured to deform upon insertion of a mobile device therein. As shown, the bumper may be a leaf spring comprising a bent elongated flexible material that is configured to collapse or translate toward the perimeter edge of the frame during insertion of a mobile device. One exemplary embodiment of a deformable bumper is provided herein, but other configurations are also contemplated and included in the scope of the present description. Such deformable bumpers may include flexible and or soft materials that may compress, deform, or otherwise provide a variable space upon application of an outside force on the bumper. FIG. 12C illustrates an exemplary embodiment of a side profile of a headset including a bumper. As seen in FIG. 12C, the headset may include an exemplary embodiment of a bumper included a flexible cover that is deformable and stretchable. The cover may be translated to hook over a top of an inserted phone to apply pressure toward an outer, forward portion of the frame toward the optical element.

Figure 13A:
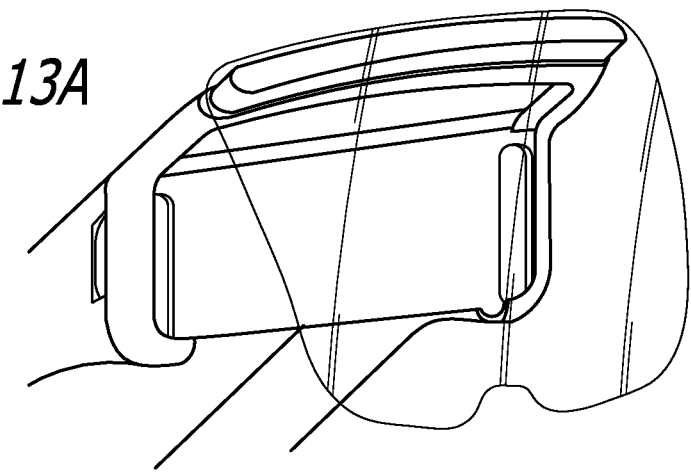
Figure 13B:
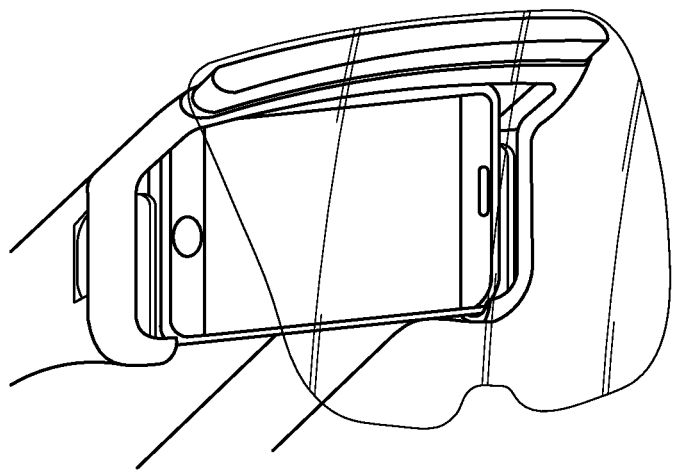

FIGS. 13A-13B illustrate an exemplary embodiment of a bumper. FIG. 13A illustrates an exemplary headset including the exemplary bumper without an mobile device inserted therein, while FIG. 13B illustrates the exemplary headset including the exemplary bumper with a mobile device inserted therein. The exemplary bumper system may be controlled by an actuator, such as a knob, on the side or back of the frame that is manually rotated to translate the bumpers toward an interior of the cavity defined by the frame. The actuator may include a lock or other mechanism for retaining pressure on the inserted mobile device through the bumpers. Exemplary embodiments may include markings and/or adjustment points such that the phone can be set to correspond to different phone sizes.

Figure 14A:
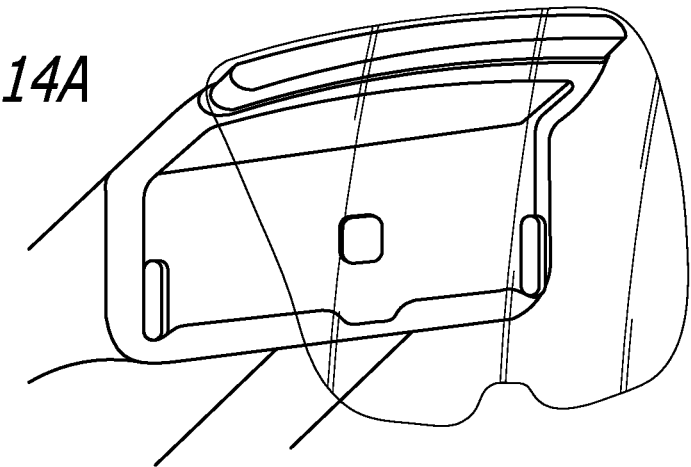
Figure 14B:
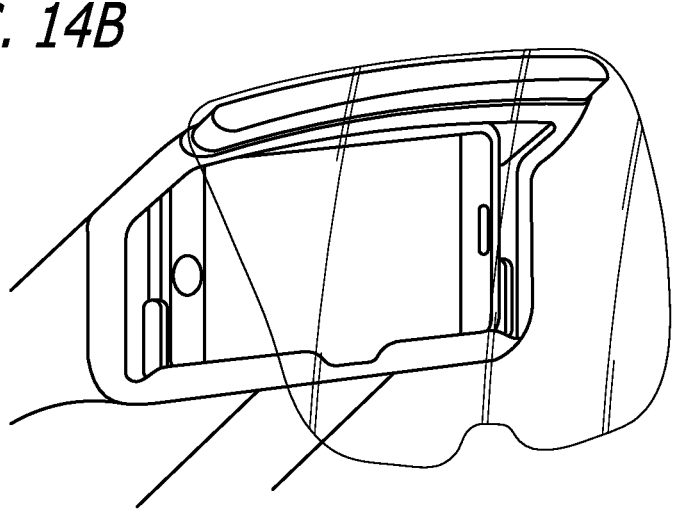

FIGS. 14A-14B illustrate an exemplary embodiment of a bumper. FIG. 14A illustrates an exemplary headset including the exemplary bumper without an mobile device inserted therein, while FIG. 14B illustrates the exemplary headset including the exemplary bumper with a mobile device inserted therein. The exemplary bumper system may incorporate an actuator within the bumper system. As shown, the bumper system may include a button on the back surface of the frame that when depressed translates lateral side bumpers toward an interior cavity defined by the frame. The button on the back may act as an unlock mechanism. Thereby the lateral side bumpers may be configured in a biased position toward the interior of the cavity of the frame. The bumpers may be moved to an exterior position to widen the space between the bumpers and locked in position. The button on the back may act as a switch to release the bumpers and permit the lateral side bumpers to revert to or toward their biased interior position.

Figure 15A:
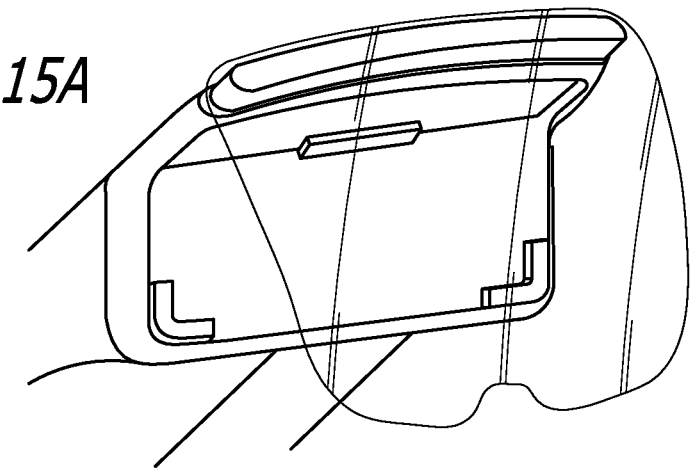
Figure 15B:
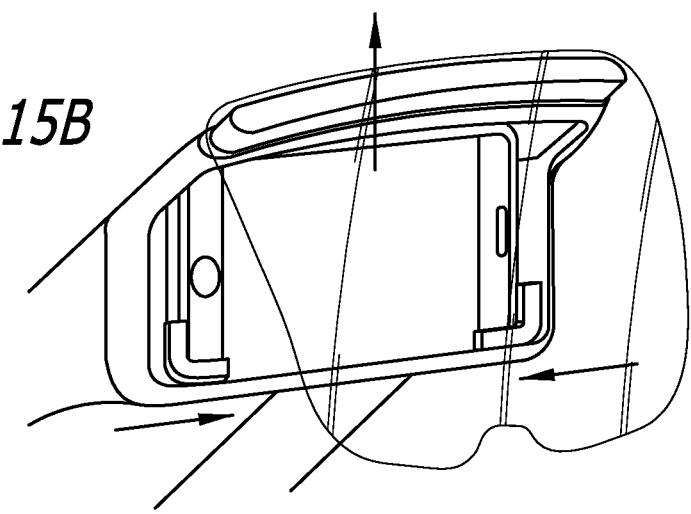

FIGS. 15A-15B illustrate an exemplary embodiment of a bumper. FIG. 15A illustrates an exemplary headset including the exemplary bumper without an mobile device inserted therein, while FIG. 15B illustrates the exemplary headset including the exemplary bumper with a mobile device inserted therein. The bumper system as illustrated incorporates an actuator to translate the lateral side bumpers when a mobile device is inserted therein. The bumper system may include a top actuator that is lifted with the insertion of the phone. The actuator is coupled to the bumpers to translate the bumpers toward an interior of the cavity defined by the frame.

Figure 16A:
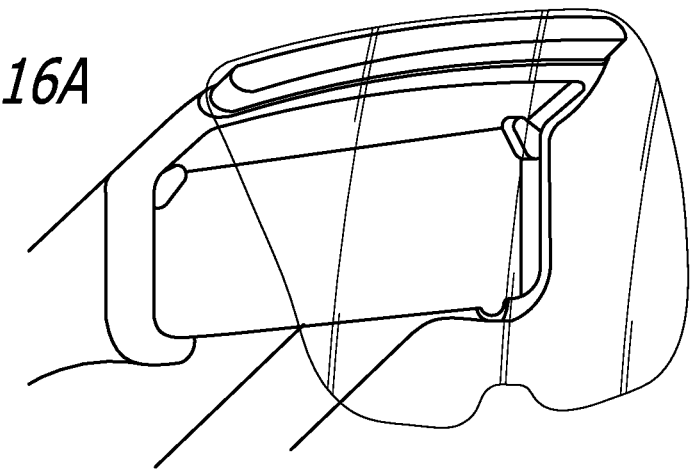
Figure 16B:
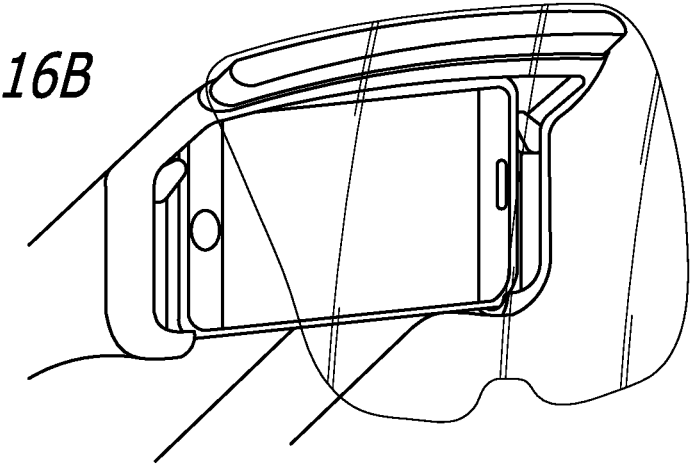

FIGS. 16A-16B illustrate an exemplary embodiment of a bumper. FIG. 16A illustrates an exemplary headset including the exemplary bumper without an mobile device inserted therein, while FIG. 16B illustrates the exemplary headset including the exemplary bumper with a mobile device inserted therein. The bumper system as illustrated incorporates rotational bumpers that define oblong cams that permit the insertion of a mobile device by rotating and providing a variable internal dimension corresponding to an external dimension of the inserted device. The bumpers may be mechanically lined such that rotation of the bumpers is symmetric to provide a centering effect on the inserted device.

Figure 17A:
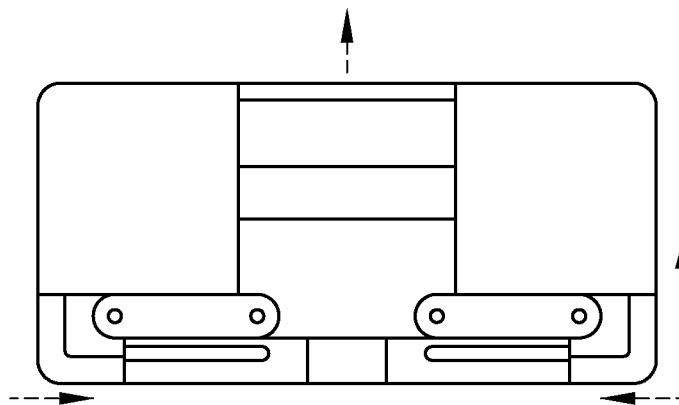
FIGS. 17A-20 illustrate exemplary coupling mechanisms for use with bumper systems described herein.
Figure 17B:
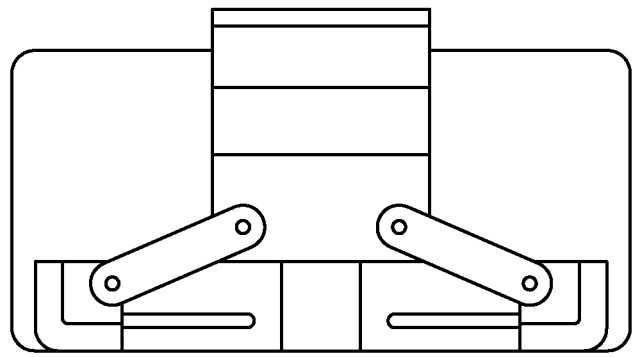
Figure 18:
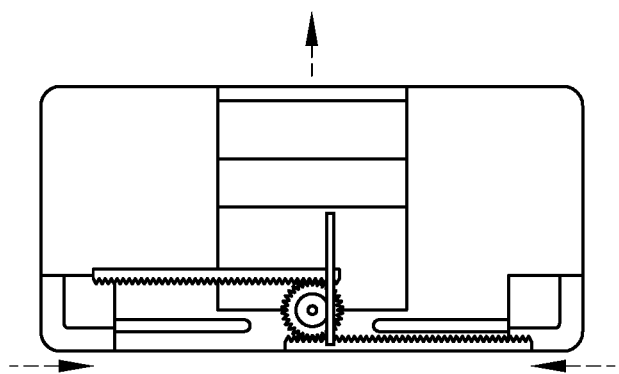
Figure 19:
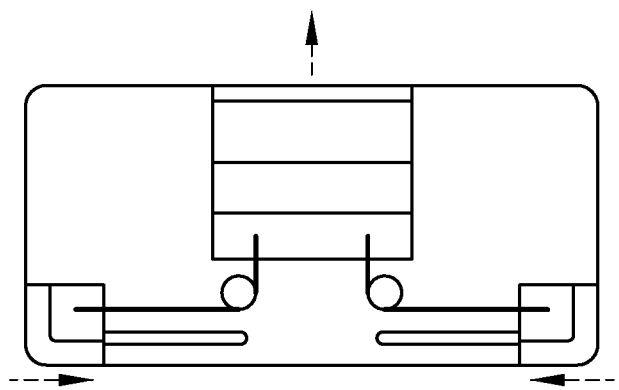

FIGS. 17-19 illustrate exemplary embodiments of a bumper coupling system. Exemplary embodiments may be used with the bumper configurations described herein, such as, for example, FIGS. 15A-15B. Exemplary coupling system between bumpers of the bumper system such that movement of the top portion translates the lateral side bumpers inward. FIGS. 17A-17B illustrate an exemplary direct linkage mechanical coupling. FIG. 18 illustrates a geared mechanical coupling. FIG. 19 illustrates a tensioned coupling in which the coupling pieces may include flexible and/or stretchable extensions between bumpers.

Figure 20A:
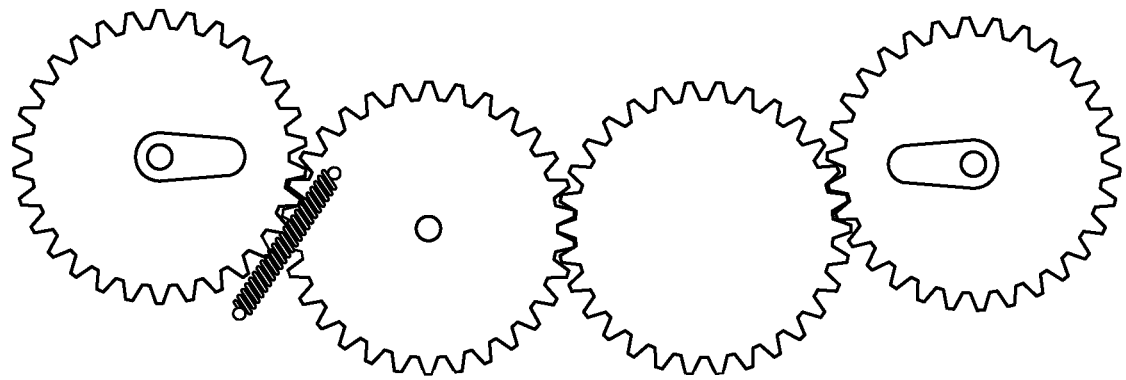
Figure 20B:

FIG. 20 illustrates an exemplary embodiment of a bumper coupling system. Exemplary embodiments may be used with the bumper configurations described herein, such as, for example, FIGS. 16A-16B. Exemplary coupling system between bumpers of the bumper system such that movement of one of the bumpers corresponds to an approximate equal movement of the other bumper. FIG. 20 illustrates an exemplary geared mechanical coupling. The exemplary embodiment include a biasing mechanism, such as a spring to rotate the bumpers to a desired initiate position.

Any combination of the features, components, configurations, or functions described herein may be used in any combination. For example, the combination of the plastic clip and the elastic-like tenting fabric keeps the smartphone's display in the proper positioning, ensuring the software solution for distortion works as intended. The plastic clip and elastic-like tenting fabric may be used with one or more bumpers. Any combination of bumpers may be used separately or together in any configuration. For example, bumpers may be used together, but moved independently, may be used together and integrated together such that their movement may be coupled along a portion of movement, may be used separately and alone.

In an exemplary embodiment, a dynamic, integrated bumper system may be used to dynamically accommodate a range of inserted mobile devices to be used in the headset. These integrated bumpers may be contained inside of the headset frame and spring loaded or otherwise biased to contact an inserted phone and position the phone relative to the frame.

In an exemplary embodiment, the dynamic, integrated bumper may include a spring-loaded bumper system. The bumper may be contained inside of the headset frame and be spring loaded to retract when the headset does not have an inserted phone. The bumpers may then be actuated when a mobile device is inserted into the frame to retain the mobile device in a desired position relative to the frame. In an exemplary embodiment, the inserted device may contact and/or depress an actuator, such as a trigger to transition the spring-loaded bumper system from a first position to a second position.

In an exemplary embodiment, the spring loaded bumper system includes an actuator and one or more bumpers. The actuator may be configured to contact an inserted mobile device and move the bumpers into a retaining position relative to the inserted device. In an exemplary embodiment, the actuator may include a pivot component that is depressed and pivoted during insertion of a phone. The rotation or depression of the actuator may be linked to the bumpers to translate the bumpers and position the bumpers in contact with the phone. The actuator and bumpers may be linked such that the greater the depression of the actuator, the greater the movement of the bumpers.

In an exemplary embodiment, the bumper and/or actuator may include a projection from the frame into an interior space configured to accommodate an inserted device. The projection may include a ramped surface configured to contact an edge of the phone and for which the phone may slide past and depress the actuator. The ramped surface may extend from the frame into an interior of the cavity defined by the frame. The ramped surface may be planar.

In an exemplary embodiment, the bumper system includes at least two bumpers coupled together. In an exemplary embodiment, the coupling may permit the concurrent and simultaneous movement of bumpers along an entire range of motion for one or both bumpers. In an exemplary embodiment, the coupling may permit the concurrent and simultaneous movement of bumpers along a portion of range of motion for one or both bumpers, and permit the independent or separate motion of one or both bumpers for another portion of the range of motion of the one or both bumpers. In an exemplary embodiment, the bumpers may be coupled by a gear and rail system, a spring, and combinations thereof.

In an exemplary embodiment, the bumper system may include two bumpers coupled together. The bumpers may be rotationally attached to a frame of a headset such that the bumpers define a first position rotationally positioned from a second position. In an exemplary embodiment, the bumpers may be biased in the first position. The bumpers may be coupled such that movement of one bumper moves the other bumper by an equivalent rotational amount.

In an exemplary embodiment, the bumper system includes one or two bumpers configured to be positioned parallel to an end of an inserted mobile device. The bumpers may be configured to move toward an interior of the cavity defined by the frame when an actuator is engaged.

In an exemplary embodiment, the actuator and/or the bumper may include a rigid material, a compressible material, or a combination thereof.

Exemplary embodiments of the system may be configured to function when inserting a mobile device such as a phone into the headset by redirecting the force of inserting the phone to the motion of the bumpers coming in from the sizes. Exemplary embodiments may include two or more moving parts having pivots on unique axis to transfer forces between elements.

The integrated bumpers may include a self-contained solution to the HMD system so that a user does not have to keep track of separate inserts or frames. The bumper allows for the industrial design of the headset to include a simpler phone insertion system but allows the headset to accommodate a dynamic range of phone sizes.

In an exemplary embodiment, the dynamic, integrated bumper may include a gear-loaded bumper system. In this case, the dynamic, integrated bumper may include an actuator and a bumper. The bumper may be similar to the spring loaded system in that they may include one or more elongate structures configured to contact a terminal end of an insert phone and may be configured to move from retracted state to an engaged state, where the engaged state positions the bumpers toward an interior of the frame cavity than the retracted state.

In an exemplary embodiment, the actuator may include a gear system to link the actuator to one or more of the bumpers. The actuator may include a control, such as a knob, slider, button, switch, or combinations thereof. The control may be configured to translate, such in a linear direction, or rotate. The movement of the control may be configured to actuate a gear and/or spring system coupled to the bumper to move the bumper between the retracted and engaged positions and any intermediate position thereto.

In an exemplary embodiment, the actuator may be engaged through the insertion of the phone or manually by a user. For example, the control may be on an interior of the frame and engage the phone during insertion. As another example, the control may be on an exterior surface of the frame and accessible to a user.

In an exemplary embodiment, the actuator, bumper, control, frame, or combinations thereof may include a lock or other retaining feature to maintain the bumpers in a desired position relative to the inserted phone. For example, the actuator may include a surface that resists movement during extraction of the phone. As another example, a ratchet system may be used with the gear system such that one way motion is permitted unless a release is engaged to permit movement in an opposite direction. As another example, other locking features may be engaged such as screws, friction engagement, latch, mated surface, or other known mechanisms.

In an exemplary embodiment, a sliding gear rack system may dynamically accommodate a range of phone sizes to be used in the headset. This gear system may be contained inside the headset body and be operated by the user when sliding a switch on the top of the headset. This system may be used when a phone has already been inserted into the headset and the user slides the adjustment switch to tighten the gear racks and center the phone in the headset.

Different screen sizes may change the effective field of view of the solution. In exemplary embodiments, the headset can designed and manufactured to accept and interchange different lenses, where each lens may be optimized for different phones.

The modular headset can be designed to work with different types/size lenses that are designed and manufactured to optimize the virtual image quality and field of view (FOV) for each of the different phones. These lenses can be attached by any removable, and replacement attachment mechanism that can be uniformly applied across different headset/lens combinations. For example, a common magnetic attachment system that can be uniform across headsets. Other attachment mechanisms may also be used.

Exemplary embodiments of the modular headset may be designed to work with the existing and after-market head straps via a common clipping system.

Exemplary embodiments of the modular headset may be designed to work with the existing and after-market head straps via a common size and Velcro system.

Exemplary embodiments may also include any combination of features as described herein or incorporated herein in reference to the features of the exemplary headset for use with embodiments of the bumper and/or bumper system described herein. For example, any combination of described features, components, or elements may be used and still fall within the scope of the instant description. For example, features may include the computing for the augmented reality experience is conducted by a smartphone inserted into the headset; the front-facing camera of an inserted smartphone has an unobstructed view through the optical element; the tracking is accomplished using information from the smartphone's front-facing camera; an output is displayed on the smartphone's screen; the optical element acts as a combiner that reflects the smartphone's screen to overlay imagery in the user's physical field of vision; the headset having only a single optical element in which light from the screen encounters between the screen and the user's eye; the headset not having any additional optical components for creating, generating, or overlaying the digital image in a user's field of view besides the optical element; the smartphone and optical element are in a fixed position during operation; the headset or system including inserts for fixing the position of an inserted mobile device during operation; the headset including dynamically adjustable mechanism for accommodating inserted mobile devices of various size; the headset including an elastic cover to shield the screen and retain the mobile device relative to the headset; the headset including retaining features to position the inserted mobile device; the headset no including computing power besides the phone; the optical element is removable; the optical element can fold for storage or transportation relative to the compartment; the optical element consists of two sub-components to display stereoscopic imagery; the optical element including a coating on a first surface to reflect an image from the mobile device; the optical element including an anti-reflective coating on another surface to reduce reflection of an image from the mobile device; the optical element including a spherical curvature; the optical element having a uniform thickness; the optical element contains magnets and the compartment or a frame contains mating magnets that allow the optical element to attach and detach from the frame of the headset such that it is always in the correct positioning; integrated or removable straps or band secure the headset to a user's face; the compartment having a face cushion for comfort during use; the compartment having an integrated optical component covering the front-facing camera of the smartphone; the integrated optical component covering the front-facing camera of the smartphone modifies the image entering the front-facing camera to improve tracking area; the optical component is a prism; the optical component is a wide-angle lens; the mounting system including modular straps and support frames; the mounting system straps including surface features to increase structural support; the mounting system support features including an indentation on a broad side of the strap toward a user's head; The mounting system straps including tapered thickness; the mounting system including keyed mating surfaces to define an orientation or a mated pair; and any combination thereof or otherwise described herein.

Although embodiments of this invention have been fully described with reference to the accompanying drawings, it is to be noted that various changes and modifications will become apparent to those skilled in the art. Such changes and modifications are to be understood as being included within the scope of the present disclosure as defined by the appended claims. Specifically, exemplary components are described herein. Any combination of these components may be used in any combination. For example, any component, feature, step or part may be integrated, separated, sub-divided, removed, duplicated, added, or used in any combination with any other component, feature, step or part or itself and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components. The specification may also include a description of options including any combination of described features. The combination of features may be used together or separately in any sub combination available by the identified list and/or in combination with any other known alternatives. The specification may also provide measurements or alternatives in different approximations. The given approximation or comparison is within the tolerance as would be understood by a person of skill in the art to achieve the given function and/or within the general tolerances for the specific component parts according to known and generally accepted manufacturing methods accounting for alignment requirements, cost of manufacturing, the tolerance permitted by the given connection and component configurations, among other considerations that would be known to a person of skill in the art.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A headset system, comprising:
   a frame defining a compartment formed by opposite lateral sides, a bottom side with a contact surface, a front side carried from the bottom side, and a back side carried from the frame, the compartment sized to removably receive a mobile device to be seated against the contact surface and front side;
   an optical element coupled to the frame and sized to define a field of view, formed with a display that overlays virtual objects within the field of view during operation, and having a first surface received with a reflective coating that reflects an image displayed on the mobile device when received in the compartment; and
   a bumper system including mechanically coupled bumpers extending from the frame and positioned to bias in a predetermined position, the seated mobile device against the frame, the bumper system further defining a first position relative to the frame and a second position relative to the frame.

2. The headset of claim 1, wherein the bumper system comprises a first bumper and a second bumper coupled to the frame.

3. The headset of claim 2, wherein the first bumper and the second bumper are coupled together such that over a portion of a range of motion both the first bumper and second bumper move simultaneously and that over a second range of motion one of the first bumper and second bumper may move independent from an other one of the second bumper and first bumper through the second range of motion while an other of the second bumper and second bumper does not move.

4. The headset of claim 2, wherein the first bumper and the second bumper are coupled together such that movement of the first bumper moves the second bumper by an equivalent amount.

5. The headset of claim 4, wherein the first bumper and the second bumper are rotationally coupled to the frame and the coupled movement is over an entire range of motion of the first bumper and the second bumper such that the first bumper and second bumper do not move independently of each other.

6. The headset of claim 5, wherein the first bumper and the second bumper are coupled to each other by a rail and gear.

7. The headset of claim 6, wherein the first bumper and second bumper each define a first planar surface and a second planar surface perpendicular to the first planar surface.

8. The headset of claim 7, wherein the first bumper and second bumper each define a lip extending from a terminal end of the second planar surface, wherein the lip is approximately parallel to the first surface.

9. The headset of claim 4, wherein the first bumper and the second bumper are spring biased in the first position.

10. The headset of claim 4, further comprising a third bumper independent of the first bumper and the second bumper.

11. The headset of claim 10, wherein the first and second bumper are positioned to restrict movement of an inserted device in a first linear direction and the third bumper is configured to restrict movement in a second direction different from the first direction.

12. The headset of claim 11, wherein third bumper is biased in an extended position when the system is in the first position.

13. The headset of claim 12, further comprising a fourth bumper independent of the first bumper, the second bumper, and the third bumper.

14. The headset of claim 13, wherein the fourth bumper comprises an elastic cover.

15. The headset of claim 10, wherein the third bumper comprises an elastic cover.

16. The headset of claim 2, wherein the bumper system components cooperate to center an inserted mobile device positioned in the frame relative to the optical element.

* * * * *